United States Patent [19]
Fijita et al.

[11] Patent Number: 5,841,740
[45] Date of Patent: Nov. 24, 1998

[54] APPARATUS FOR RECORDING AND REPRODUCING INFORMATION DATA USING RECORDING REGION DATA FOR REPRODUCTION WITH AUDIO AND VIDEO DATA

[75] Inventors: Horoyuki Fijita; Norikazu Ito, both of Kanagawa, Japan

[73] Assignee: Sony Corporation, Tokyo, Japan

[21] Appl. No.: 759,458

[22] Filed: Dec. 5, 1996

[30] Foreign Application Priority Data

Dec. 8, 1995 [JP] Japan .................................... 7-320185
Dec. 8, 1995 [JP] Japan .................................... 7-320186

[51] Int. Cl.$^6$ .................................................. G11B 17/22
[52] U.S. Cl. .............................. 369/32; 369/83; 360/13
[58] Field of Search ................................. 369/32, 58, 47, 369/83, 48, 84, 275.3; 360/13, 15; 358/126, 125

[56] References Cited

U.S. PATENT DOCUMENTS

| | | | |
|---|---|---|---|
| 5,359,465 | 10/1994 | Miyadera | 360/13 |
| 5,471,452 | 11/1995 | Kishi | 369/83 |
| 5,691,972 | 11/1997 | Tsuga et al. | 369/32 |
| 5,701,282 | 12/1997 | Matsumoto et al. | 369/32 |

*Primary Examiner*—Tan Dinh
*Attorney, Agent, or Firm*—Frommer Lawrence & Haug, LLP; William S. Frommer

[57] ABSTRACT

An information data recording and reproducing apparatus is disclosed. Editing data showing the parts of the stock data contained in the audio and/or video data obtained as a result of editing is output from an editing device to a control system. The control system generates recording region data for reproduction showing the recording regions occupied by the parts of the stock data in the recording medium of a hard disc array in advance based on the received editing data and recording region data showing the recording regions occupied by the stock data having parts to be contained in the edited audio and/or video data in the recording medium of the hard disc array. The parts of the stock data are reproduced from the hard disc array based on this recording region data for reproduction and audio and/or video data having the same content as that of the edited audio and/or video data is reproduced.

9 Claims, 24 Drawing Sheets

FIG. 4A

| FILE NAME |
|---|
| LINK OF FIRST RECORD ENTRY |

FIG. 4B

| LINK OF NEXT RECORD ENTRY |
|---|
| HEAD POSITION DATA |
| RECORDING LENGTH DATA |

FIG. 4C

| LINK OF NEXT FREE SPACE |
|---|
| HEAD POSITION DATA |
| RECORDING LENGTH DATA |

FIG. 5

| FILE NAME 1 | REPRODUCTION START POSITION | REPRODUCTION ENDING POSITION |
|---|---|---|
| FILE NAME 2 | REPRODUCTION START POSITION | REPRODUCTION ENDING POSITION |
| FILE NAME 3 | REPRODUCTION START POSITION | REPRODUCTION ENDING POSITION |
| ⋮ | ⋮ | ⋮ |

FIG. 6

| FILE NAME | REPRODUCTION START POSITION | REPRODUCTION ENDING POSITION |
|---|---|---|
| A | 10 | 50 |
| B | 20 | 40 |

FIG. 10A

| FILE NAME |
|---|
| LINK OF FIRST RECORD ENTRY |

FIG. 10B

| LINK OF NEXT RECORD ENTRY |
|---|
| HEAD POSITION DATA |
| RECORDING LENGTH DATA |
| DELETE ENABLE FLAG |

FIG. 10C

| LINK OF NEXT FREE SPACE |
|---|
| HEAD POSITION DATA |
| RECORDING LENGTH DATA |

| FILE NAME | REPRODUCTION START POSITION | REPRODUCTION ENDING POSITION |
|---|---|---|
| A | 10 | 50 |
| B | 20 | 60 |

FIG. 18A
| FAIL NAME | REPRODUCTION START POSITION | REPRODUCTION ENDING POSITION |
|---|---|---|
| FILE (1) | START (1) | END (1) |
| FILE (2) | START (2) | END (2) |
| ⋮ | ⋮ | ⋮ |
| FILE (n) | START (n) | END (n) |
| ⋮ | ⋮ | ⋮ |
| FILE (N) | START (N) | END (N) |
FIG. 18B
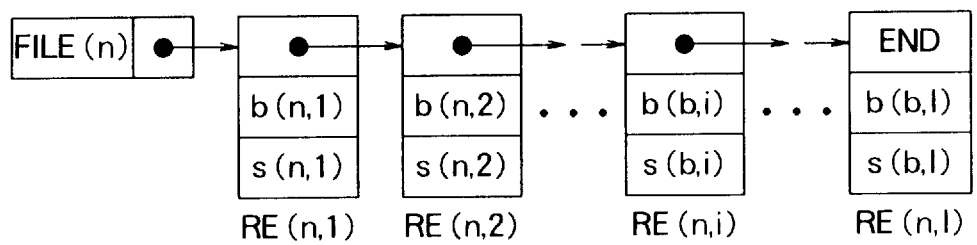
FIG. 18C
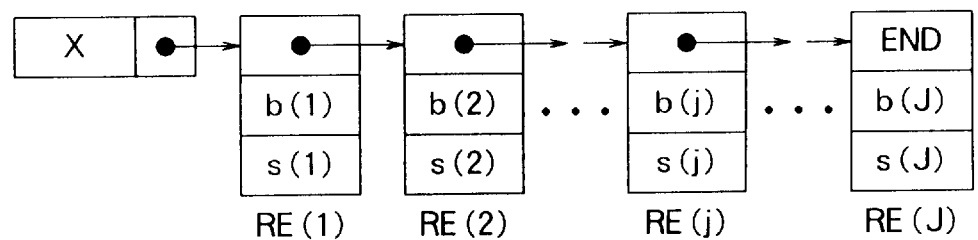

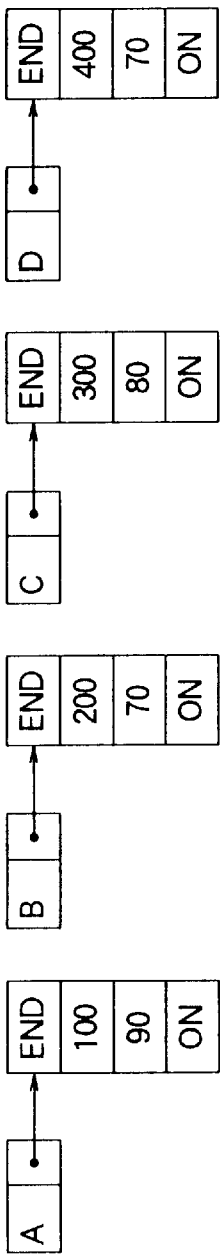
FIG. 21A
FIG. 21B
| FILE NAME | REPRODUCTION START POSITION | REPRODUCTION ENDING POSITION |
|---|---|---|
| A | 10 | 50 |
| B | 20 | 25 |
| C | 30 | 75 |
| D | 20 | 25 |
(D) EXAMPLE OF PSEUDO DATA FILE
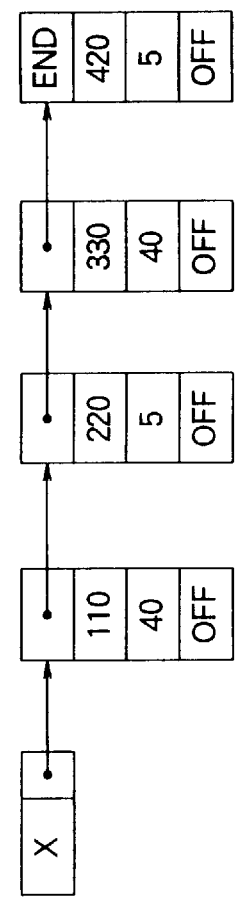
FIG. 21C

APPARATUS FOR RECORDING AND REPRODUCING INFORMATION DATA USING RECORDING REGION DATA FOR REPRODUCTION WITH AUDIO AND VIDEO DATA

BACKGROUND OF THE INVENTION

1. Field of the Invention

The present invention relates to an information data recording and reproducing apparatus and an information data recording and reproducing method for recording the audio and/or video data in a randomly accessible recording medium such as a hard disc and reproducing the recorded data.

2. Description of the Related Art

In recent years, a hard disc array comprising a large number of large capacity hard disc devices connected together, having a recording capacity of several tens to several hundreds of gigabytes (GB) as a whole, and able to perform random access has been put into practical use.

This hard disc array is suited for the recording of data having a very large amount of data such as audio data and video data or one of the same (audio and/or video data) and particularly is excellent as the recording and reproducing apparatus for an editing apparatus due to the characteristic that it can reproduce any audio and/or video data with a short access time.

However, when the edited audio and/or video data is recorded again in the hard disc array in which the audio and/or video data covered by the editing (stock data) is recorded, the audio and/or video data having the same content is recorded in an overlapping manner, the recording capacity of the hard disc array becomes wasted, and there is a possibility that it will not be possible to perform editing of audio and/or video data spanning a long period of time.

SUMMARY OF THE INVENTION

An object of the present invention is to provide an information data recording and reproducing apparatus and an information data recording and reproducing method for recording a plurality of series of information data to be edited in a randomly accessible recording medium such as a hard disc or magneto-optical disc (MO disc), reproducing any information data in accordance with a request of an external apparatus such as an editing apparatus, and providing the same.

Another object of the present invention is to provide an information data recording and reproducing apparatus and an information data recording and reproducing method suited for editing of the information data spanning a long period of time.

Further, still another object of the present invention is to provide an information data recording and reproducing apparatus and an information data recording and reproducing method with which information data having exactly the same content as that of the information data of the result of editing (edited data) can be reproduced without recording all of the information data having the same content in the recording medium in an overlapping manner.

To achieve the above objects, the information data recording and reproducing apparatus according to the present invention is an information data recording and reproducing apparatus comprising: an information data recording means for recording a plurality of series of information data in a randomly accessible recording medium, a first recording region generating means for generating first recording region data showing the recording regions occupied by the plurality of series of information data in the recording medium, and a combination reproducing means for reproducing by combination as partial data part or all of the information data of the stock data recorded in the recording medium. The combination reproducing means has a second recording region data generating means for generating second recording region data showing the recording regions occupied by the partial data to be reproduced by combination in the recording medium based on the first recording region data of the stock data, and a partial data reproducing means for reproducing the partial data from the recording medium based on the generated second recording region data.

Preferably, the first recording region data generating means generates a first recording region list showing at least the recording regions occupied by the plurality of series of information data in the recording medium in the form of a linked list showing mutual linkage and includes this in the first recording region data, the second recording region data generating means of the combination reproducing means generates a second recording region list showing at least the recording regions occupied by the partial data to be reproduced by combination in the recording medium in the form of the linked list based on order data showing the order for reproducing the partial data, reproduction range data showing the range occupied by the partial data in the stock data, and the first recording region data of the stock data and includes this in the second recording region data, and the partial data reproducing means reproduces the partial data from the recording regions of the recording medium shown by the second recording region list.

Preferably, the reproduction range data showing the range occupied by the partial data in the stock data contains a reproduction start position and a reproduction ending position of the partial data in the stock data or one of the same.

Preferably, the first recording region list generated by the first recording region data generating means and the second recording region list generated by the second recording region data generating means further contain identification flags and adopt mutually the same structure of data, the first recording region data generating means sets the identification flag of the first recording region list to a first value, the second recording region data generating means of the combination reproducing means sets the identification flag of the second recording region list to a second value, and provision is further made of a recording region releasing means for releasing the recording regions of the recording medium shown by the first recording region list and deleting the first recording region list only in a case where the value of the identification data is the first value when receiving a request for releasing the recording regions of the recording medium shown by the first recording region list and the second recording region list.

Specifically, the plurality of series of information data is a plurality of audio and/or video data.

Further, to achieve the above object, the information data recording and reproducing method according to the present invention is an information data recording and reproducing method comprising steps of: recording a plurality of series of information data in a randomly accessible recording medium, generating a recording region list showing the recording regions occupied by the partial data to be reproduced by combination in the recording medium in the form of a linked list when reproducing by combination as partial data part or all of the information data of the stock data recorded in the recording medium, and reproducing the partial data from the recording regions of the recording medium shown by the generated recording region list.

Further, to achieve the above object, the other information recording and reproducing apparatus according to the present invention is an information recording and reproducing apparatus, comprising: a first information data recording means for recording a plurality of series of information data in a randomly accessible recording medium, a first recording region generating means for generating a first recording region data indicating the recording regions occupied by the plurality of series of information data in the recording medium a combination reproducing means for reproducing data by combining as partial data part or all of the information data serving as the stock data recorded in the recording medium, and a second information data recording means for continuously recording short partial data having a data length not more than a predetermined data length and a predetermined part of the partial data reproduced before and after the short partial data in a predetermined recording region of the recording medium where the data length of the partial data is not more than the predetermined data length, the combination reproducing means has a second recording region data generating means for generating second recording region data indicating the recording regions occupied in the recording medium by the partial data reproduced by combination and the predetermined part of the unit data and the short partial data recorded in the predetermined recording region of the recording medium based on the first recording region data of the stock data and a partial data reproducing means for reproducing the partial data from the recording medium based on the generated second recording region data.

Specifically, the plurality of series of information data is a plurality of series of audio and/or video data.

Further, to achieve the above object, the other information recording and reproducing method according to the present invention is an information data recording and reproducing method comprising the steps of: recording a plurality of series of information data in a randomly accessible recording medium, continuously recording short partial data having a data length not more than a predetermined data length and a predetermined part of the partial data reproduced before and after the short partial data in a predetermined recording region of the recording medium where the data length of the partial data is not more than the predetermined data length when reproducing data by combining as partial data part or all of the information data serving as the stock data recorded in the recording medium, generating a recording region list for indicating the recording regions occupied by the partial data reproduced in combination and the predetermined part of the partial data recorded in the predetermined recording region of the recording medium and the short partial data in the recording medium by a linked list format, and reproducing the partial data from the recording regions of the recording medium indicated by the generated recording region list.

BRIEF DESCRIPTION OF THE DRAWINGS

The above and other objects and features of the present invention will be more apparent in detail with reference to the accompanying drawings, in which;

FIGS. 4A to 4C are views illustrating the contents of the recording region data stored in the RAM circuit by the microprocessor circuit shown in FIG. 2 in the first embodiment;

FIG. 5 is a view illustrating the contents of the editing data output by the editing apparatus shown in FIG. 1 to the control system in the first embodiment;

FIG. 6 is a view illustrating the contents of the editing data output by the editing apparatus shown in FIG. 1 to the control system in the first embodiment;

FIGS. 10A to 10C are views illustrating the contents of the recording region data of the stock data stored in the RAM circuit by the microprocessor circuit shown in FIG. 2 in the second embodiment;

FIGS. 18A to 18C are views illustrating the editing data, record entry, and the reproduction entry;

FIGS. 21A to 21C are views showing the record entry of the stock data A to D generated by the control system shown in the second embodiment based on the editing data received from the editing apparatus and the reproduction entry of the edited data;

FIG. 2(A & B) is a flowchart showing the content of the compile processing performed by the control system of the data recording and reproducing apparatus in the third embodiment;

DETAILED DESCRIPTION OF THE PREFERRED EMBODIMENTS

First Embodiment

Below, a first embodiment of the present invention will be explained.

Figure 1:
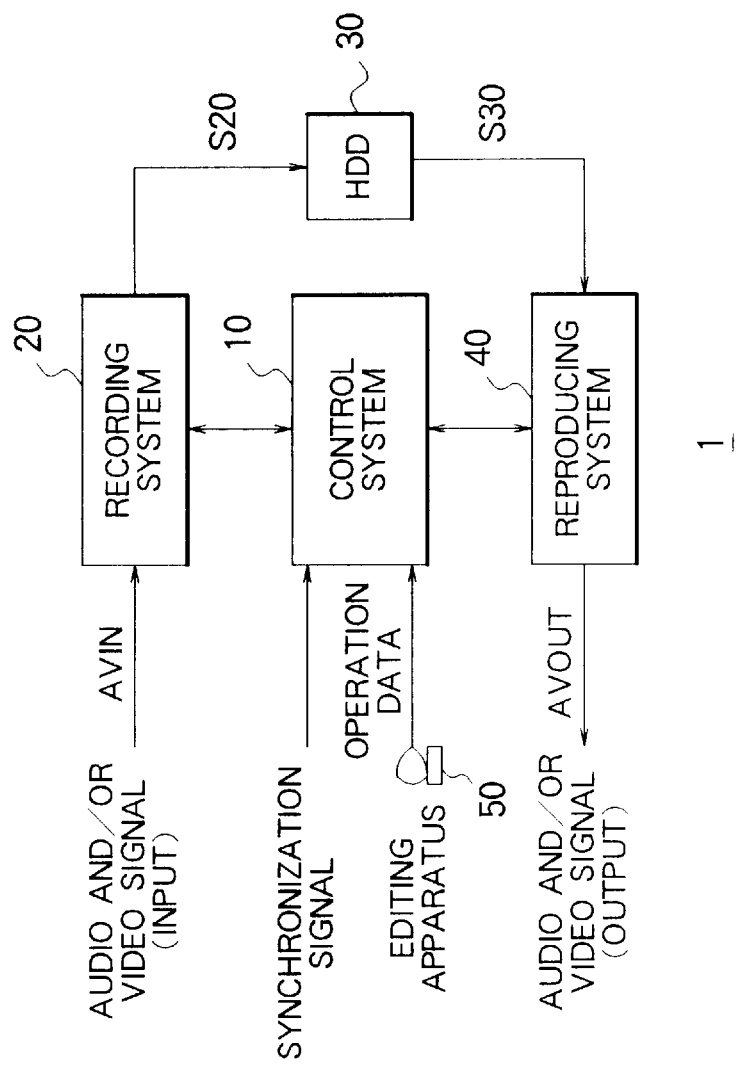
FIG. 1 is a view of the configuration of a data recording and reproducing apparatus according to the present invention.

FIG. 1 is a view of the configuration of a data recording and reproducing apparatus 1 according to the present invention.

As shown in FIG. 1, the data recording and reproducing apparatus 1 is configured by a control system 10, a recording system 20, a hard disc array (HDD) 30, and a reproducing system 40.

The data recording and reproducing apparatus 1 records a plurality of series of audio data and video data or one of the same (audio and/or video data), and provides the audio and/or video data for editing to an editing apparatus 50 in accordance with a request from the editing apparatus 50 connected to the data recording and reproducing apparatus 1. Further, the data recording and reproducing apparatus 1 receives data (editing data) indicating which part of the stock data is to be used in the audio and/or video data obtained as the result of the editing (edited data) from the editing apparatus 50 and reproduces the audio and/or video data having the same content as that of the edited data based on this editing data.

Figure 2:
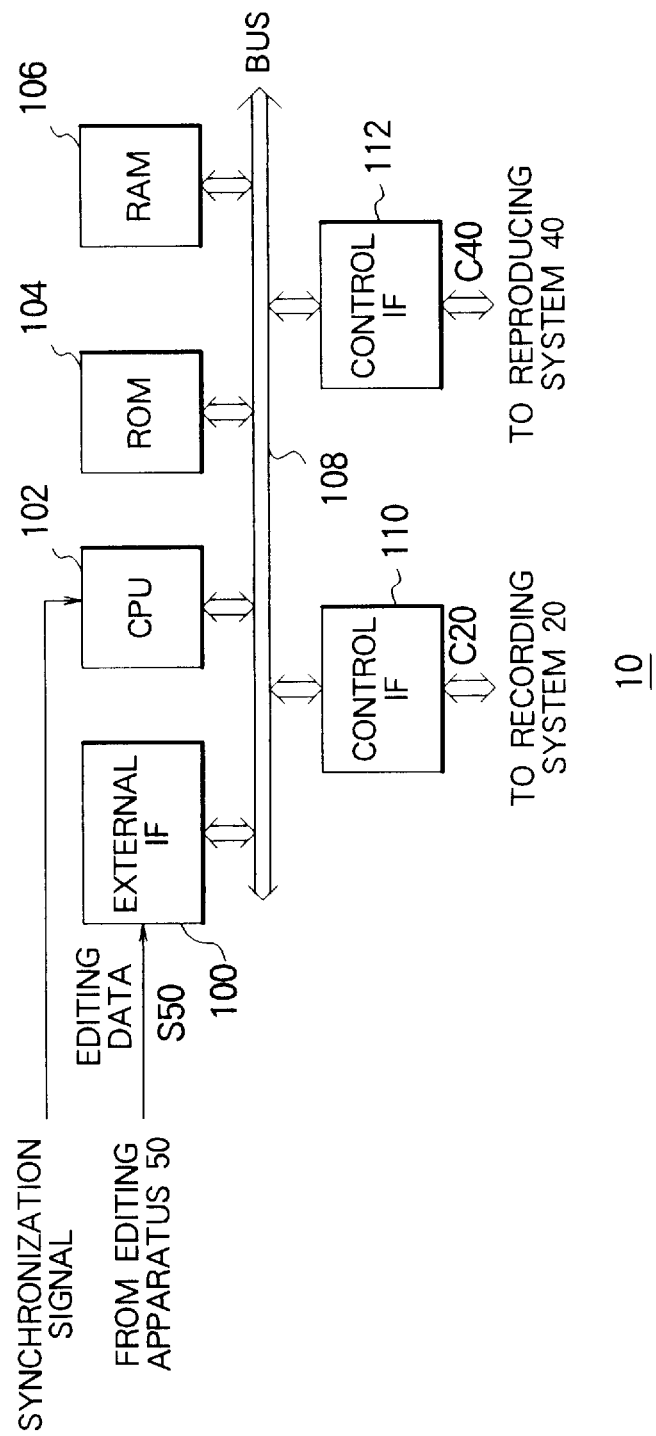
FIG. 2 is a view of the configuration of a control system shown in FIG. 1.

FIG. 2 is a view of the configuration of the control system 10 shown in FIG. 1.

As shown in FIG. 1, the control system 10 is constituted by an external interface circuit (external IF circuit) 100, a microprocessor circuit (CPU) 102, a ROM circuit 104, a RAM circuit 106, a bus 108, and control interface circuits (control IF circuits) 110 and 112.

The control system 10 constitutes the controlling computer by these component parts, controls the component parts of the data recording and reproducing apparatus 1 based on the editing data input from the editing apparatus 50 (FIG. 1) and manages the recording regions of the series of audio and/or video data recorded in the hard disc array 30.

In the control system 10, the external IF circuit 100 receives the editing data input from the editing apparatus 50 and outputs this to the microprocessor circuit 102. Further, the external IF circuit 100 receives the response data returned to the editing apparatus 50 by the microprocessor circuit 102 via the reproducing system 40 and outputs this to the editing apparatus 50.

The microprocessor circuit 102 is constituted by for example a general purpose microprocessor or an RISC (Reduced Instruction Set Computer) microprocessor and the peripheral circuits thereof. The microprocessor circuit 102 executes the programs stored in the ROM circuit 104 by using the RAM circuit 106 and transmits and receives the editing data and the response data with the editing apparatus 50.

Further, the microprocessor circuit 102 controls the parts of the data recording and reproducing apparatus 1 via the control IF circuits 110 and 112 in synchronization with a synchronization signal such as a house clock of the broadcast station, makes the hard disc array 30 record the audio and/or video data in accordance with a request from the editing apparatus 50 or other external apparatuses, and provides the recorded audio and/or video data to the editing apparatus 50 and other external apparatuses. Further, the microprocessor circuit 102 generates recording region data indicating the recording regions occupied by the series of audio and/or video data recorded in the hard disc array 30 in the recording medium (hard disc; not illustrated) of the hard disc array device 30. Further, the microprocessor circuit 102 generates recording region data of the partial data indicating the recording regions occupied by the parts (partial data) of the audio and/or video data contained in the edited data (stock data) in the recording medium of the hard disc array 30. Further, the microprocessor circuit 102 stores the generated recording region data in the RAM circuit 106 and records this via the recording system 20 in the hard disc array 30.

The contents of the recording region data generated by the microprocessor circuit 102 will be explained by a concrete example.

Figure 3A:
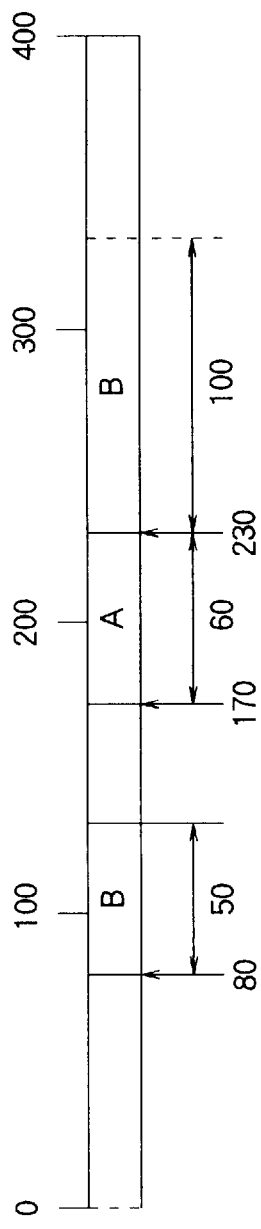
FIGS. 3A to 3D are views illustrating recording regions occupied by the audio and/or video data A and B in a recording medium of a hard disc array shown in FIG. 1 and recording region data (first recording region data) in the first embodiment.
Figure 3B:
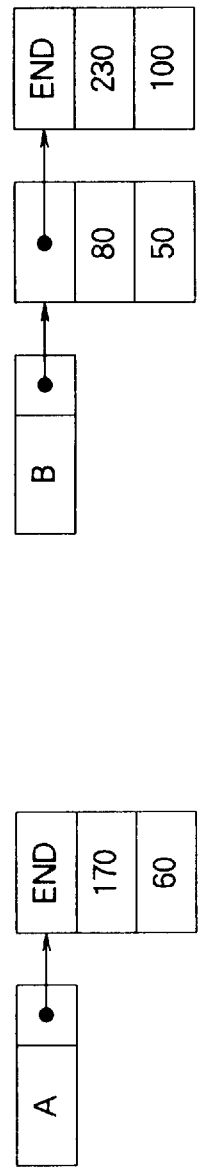
Figure 3C:
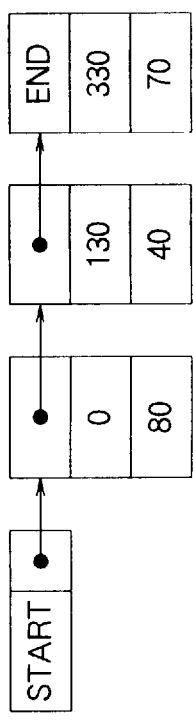

FIGS. 3A to 3C are views illustrating the recording regions occupied by the audio and/or video data A and B in the recording medium of the hard disc array device 30 shown in FIG. 1 and the recording region data (first recording region data) in the first embodiment.

FIGS. 4A to 4C are views illustrating the content of the recording region data stored by the microprocessor circuit 102 shown in FIG. 2 in the RAM circuit 106 in the first embodiment.

For example, as shown in FIG. 3A, the audio and/or video data A and B are recorded in the recording medium of the hard disc array device 30. The audio and/or video data B is recorded from the 80th block to 129th block from the head of the recording medium and from the 230th block to 329th block (one block is for example one gigabyte (GB)), while the audio and/or video data A is recorded from the 170th block to 229th block from the head of the recording medium. The other recording regions are empty recording regions.

A situation where the audio and/or video data A and B are recorded as shown in FIG. 3A may occur in a case where, for example, when the audio and/or video data is recorded, the 170th block and subsequent blocks of the recording medium exist as the empty recording region nearest the head of the recording region, all of the audio and/or video data A is recorded in the 170th block to 229th block, and thereafter the audio and/or video data recorded in the 80th block to 129th block are deleted, this recording region is released and becomes an empty recording region, the part on the head side of the audio and/or video data B is recorded in this part, and the part on the rear side is recorded in the 230th block and subsequent blocks.

In this way, there is a case where one series of audio and/or video data will be divided and recorded in a plurality of recording regions, so the microprocessor circuit 102 prepares the recording region data of each of the audio and/or video data A and B as a list (record entry) of the linked list format shown in FIGS. 3B and 3C. Further, the microprocessor circuit 102 stores the link data (file entry) indicating the file name and the first record entry in the RAM circuit 106 as shown in FIG. 4A for each of the audio and/or video data A and B. Each of the record entries is comprised by, as shown in FIG. 4B, link data indicating the next record entry, head position data indicating the head position of the recording region, and the recording length data indicating the length of the recording region. Note that, where the link data is the end value (END), the next record entry does not exist, and the last part of the audio and/or video data is recorded in the recording region indicated by that record entry.

Figure 3D:
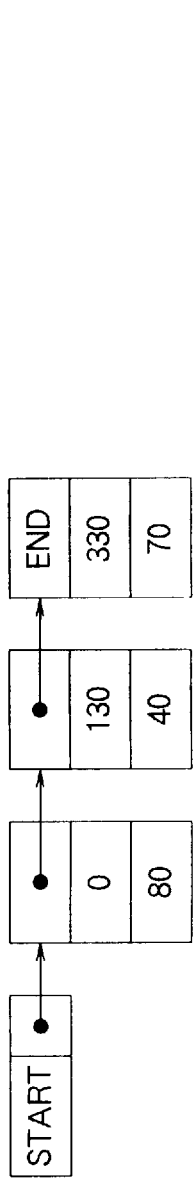

Further, the microprocessor circuit 102 generates empty recording region data indicating the empty recording regions (free space) of the hard disc array 30 as a list (free space list) of a linked list format as shown in FIG. 3D. The free space list is comprised by, as shown in FIG. 4C, link data of the next empty recording region, head position data indicating the head position of the empty recording region, and recording length data indicating the length of the empty recording region.

Further, the microprocessor circuit 102 controls the reproducing system 40 at the startup of the data recording and reproducing apparatus 1 to make it reproduce the recording position data from the predetermined recording region of the hard disc array device 30 and generate the above data based on the reproduced recording position data and the data regarding the file name and the data length of the audio and/or video data received from the editing apparatus 50 and other external apparatuses.

FIG. 5 and FIG. 6 are views illustrating the content of the editing data output by the editing apparatus 50 shown in FIG. 1 to the control system 10.

The editing data output by the editing apparatus 50 (FIG. 1) to the control system 10 of the data recording and reproducing apparatus 1 is comprised by, for example, as shown in FIG. 5, the file name of the audio and/or video data (stock data) having a part used for the edited data, the reproduction start position data indicating the leading position in the stock data of the part (partial data) which will be contained in the edited data among the stock data, and the reproduction ending position data indicating the last position of the partial data in the stock data.

For example, where the 10th block to 50th block from the head of the audio and/or video data (stock data) A is used as the partial data and the 20th block to 40th block from the head of the stock data B is used as the partial data, the content of the editing data becomes as shown in FIG. 6.

The control system 10 controls the reproducing system 40 to make it reproduce the data by combining in the order indicated by the editing data the partial data existing in a range from the reproduction start position data to the reproduction ending position (reproduction range data) among the stock data indicated by the file name of the editing data and the record entry, whereby the audio and/or video data having the same content as that of the edited result data determined as the result of the editing by the editor in the editing apparatus 50 can be reproduced. When taking as an example a case shown in FIG. 3 and FIG. 6, the control system 10 makes the reproducing system 40 reproduce the 180th block to 219th block of the hard disc array 30 and next reproduce the 100th block to 119th block, whereby the audio and/or video data having the same content as that of the edited result data is reproduced.

Figure 7:
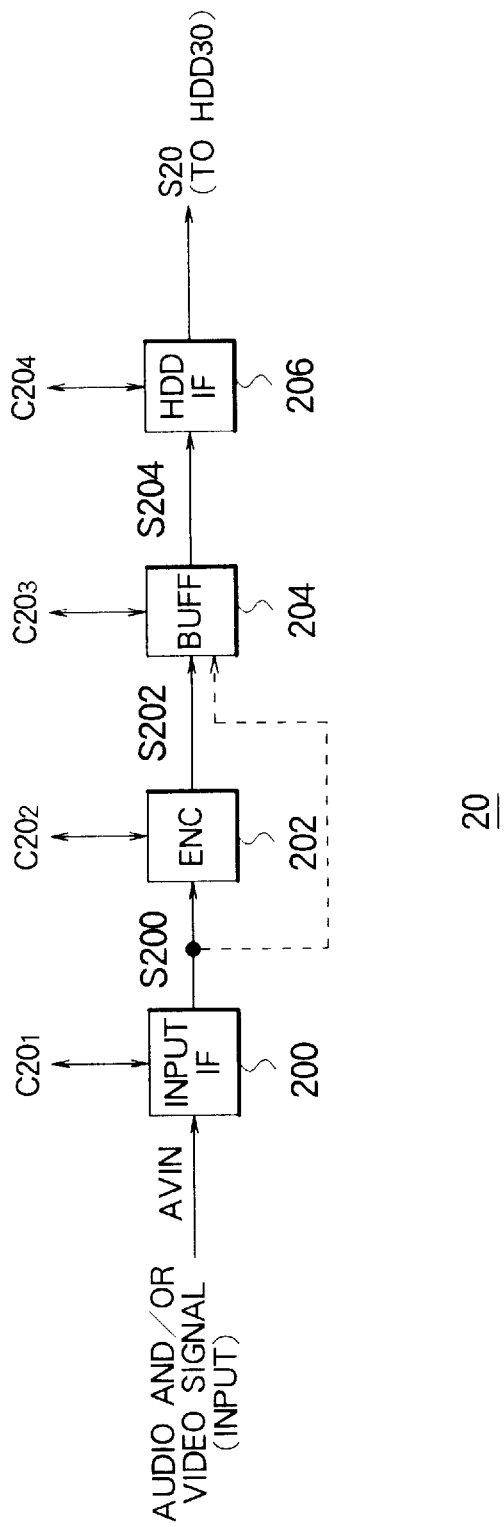
FIG. 7 is a view of the configuration of the recording system shown in FIG. 1.

FIG. 7 is a view of the configuration of the recording system 20 shown in FIG. 1.

As shown in FIG. 7, the recording system 20 is constitute by an input interface circuit (input IF circuit) 200, an encoder circuit (ENC) 202, a buffer circuit (Buff) 204, and a hard disc interface circuit (HDD IF circuit) 206.

The component parts of the recording system 20 operate under control by the control signals $C20_1$ to $C20_4$ from the control system 10, compress and code the audio and/or video data of an analog format or digital format input from an external apparatus such as a communication line or a video tape recorder (VTR), and records the compressed and coded data in the hard disc array 30.

In the recording system 20, the input IF circuit 200 receives the audio and/or video signal of the analog format from the external apparatus, converts this to the audio and/or video data of the digital format, and outputs the same to the encoder circuit 202. Note that, where the audio and/or video data of the digital format is input, the input IF circuit 200 receives the audio and/or video data and outputs this as it is to the encoder circuit 202.

The encoder circuit 202 compresses and codes the audio and/or video data input from the input IF circuit 200 by for example an MPEG system and outputs the compressed and coded data to the buffer circuit 204. Note that, where the audio and/or video data input from the input IF circuit 200 has been already compressed and coded, as indicated by a dotted line in FIG. 7, the encoder circuit 202 can be omitted.

The buffer circuit 204 buffers the compressed and coded audio and/or video data and outputs the same to the HDD IF circuit 206. In this way, the buffer circuit 204 adjusts the timing of input/output of the data between the encoder circuit 202 and the HDD IF circuit 206.

The HDD IF circuit 206 outputs the audio and/or video data (S20) to the hard disc array 30 according to for example an SCSI (Small Computer System Interface) protocol, designates the empty recording regions indicated by the free space list (FIG. 3D, FIG. 4C) input from the control system 10 in the hard disc array 30, and makes it record the audio and/or video data input from the buffer circuit 204 in the designated empty recording regions in order.

The hard disc array 30 (FIG. 1) is constituted by for example a large number of large capacity hard disc devices, uses the hard discs (not illustrated) possessed by the large number of hard disc devices as a single randomly accessible recording medium having a recording capacity of 400 GB as a whole, records the audio and/or video data input from the buffer circuit 204 of the recording system 20 in the designated recording regions of the recording medium according to the SCSI protocol, reproduces the stock data from the designated recording regions, and outputs the same to the HDD IF circuit 400 (FIG. 8) of the reproducing system 40.

Figure 8:
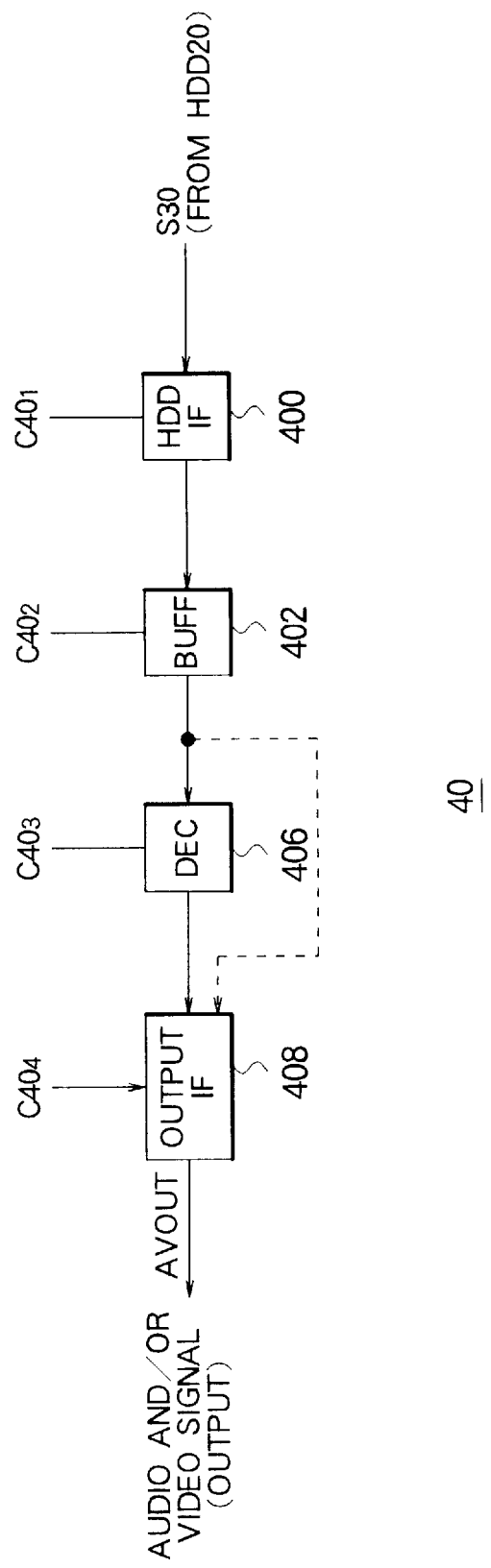
FIG. 8 is a view of the configuration of the reproducing system shown in FIG. 1.

FIG. 8 is a view of the configuration of the reproducing system 40 shown in FIG. 1.

As shown in FIG. 8, the reproducing system 40 is constituted by an HDD IF circuit 400, a buffer circuit 402, a decoder circuit (DEC) 406, and an output interface circuit (output IF circuit) 408.

The component parts of the reproducing system 40 operate under the control of the control system 10 via control signals $C40_1$ to $C40_4$ and reproduce the audio and/or video data (stock data) designated by the control system 10 from the hard disc array 30 or part (partial data) of the stock data, expand and decode the same, and output the resultant data to the external apparatus.

In the reproducing system 40, the HDD IF circuit 400 makes the hard disc array 30 reproduce the audio and/or video data from the recording regions designated by the control system 10, receives the audio and/or video data reproduced according to for example the SCSI protocol, and outputs this to the buffer circuit 402.

The buffer circuit 402 buffers the audio and/or video data input from the HDD IF circuit 400, adjusts the input/output timing of the data, and outputs the resultant data to the decoder circuit 406.

The decoder circuit 406 expands and decodes the audio and/or video data input from the buffer circuit 402 and outputs the resultant data to the output IF circuit 408. Note that, as indicated by the dotted line in FIG. 8, where noncompressed audio and/or video data is input from the buffer circuit 402, the decoder circuit 404 is unnecessary.

The output IF circuit 408 converts the audio and/or video data of the digital format input from the decoder circuit 406 to an audio and/or video signal of the analog format and outputs the same to the external apparatus. Note that, where the external apparatus connected to the output IF circuit 408 handles audio and/or video data of the digital format, the output IF circuit 408 does not convert the audio and/or video data to the analog format data, but outputs this as it is to the external apparatus.

Below, the operation of the data recording and reproducing apparatus 1 in the first embodiment will be explained.

First, an explanation will be made of the operation of recording the audio and/or video signal input from the outside in the hard disc array 30 by the data recording and reproducing apparatus 1.

The input IF circuit 200 (FIG. 7) converts the input audio and/or video signal to digital format data. The encoder circuit 202 compresses and codes the input audio and/or video data. The buffer circuit 204 adjusts the timing of the input/output of the data between the encoder circuit 202 and the HDD IF circuit 206.

The HDD IF circuit 206 records the audio and/or video data (stock data) in the empty recording regions indicated by the free space list (FIG. 3D, FIG. 4C) input from the control system 10. At this time, the microprocessor circuit 102 of the control system 10 generates the record entry shown in FIGS. 3B and 3C and FIG. 4, updates the free space list shown in FIG. 3D, stores this in the RAM circuit 106 (FIG. 2), and records this in a predetermined recording region of the hard disc array 30.

Next, the operation of the data recording and reproducing apparatus 1 at the time of editing by the editing apparatus 50 will be explained.

The control system 10 controls the reproducing system 40 to make it reproduce the stock data designated by the editing apparatus 50 and returns the record entry of the reproduced stock data to the editing apparatus 50 as the response data.

The editing apparatus 50 displays the audio and/or video of the stock data sent from the data recording and reproducing apparatus 1 to the editor. The editor determines the audio and/or video to be contained in the audio and/or video data for the program while watching and listening to the displayed audio and/or video.

The editor inputs data indicating the audio and/or video to be adopted to the editing apparatus 50. The editing apparatus 50 generates the editing data (FIG. 5) indicating the partial data used in the audio and/or video data (edited data) for the program and the order thereof according to the record entry received from the control system 10 and the data input by the editor and outputs the same to the control system 10.

The microprocessor circuit 102 (FIG. 2) of the control system 10 stores the received editing data in the RAM circuit 106 and controls the recording system 20 to make it record the editing data in a predetermined recording region of the hard disc array 30.

Next, an explanation will be made of the operation for reproducing the audio and/or video data having the same content as that of the edited data by the data recording and reproducing apparatus 1 based on the editing data (FIG. 5) stored in the RAM circuit 106.

The microprocessor circuit 102 (FIG. 2) of the control system 10 calculates the recording regions of the recording medium of the hard disc array 30 in which the partial data contained in the edited data is recorded based on the editing data stored in the RAM circuit 106 and the recording position data (FIGS. 3B, 3C and 4B) and outputs the same to the HDD IF circuit 400 (FIG. 8) of the reproducing system 40.

The HDDIF circuit 400 reproduces the audio and/or video data (partial data) from the recording region of the partial data input from the control system 10 in the order indicated by the editing data. The buffer circuit 402 adjusts the timing of the data input/output between the HDD IF circuit 400 and the decoder circuit 406. The decoder circuit 406 expands and decodes the input audio and/or video data. The output IF circuit 408 converts the audio and/or video data to audio and/or video signal of the analog format and outputs the same to the external apparatus.

By constituting the data recording and reproducing apparatus 1 as described above, audio and/or video data the same as the result of editing can be reproduced without further recording the edited data comprised by the part (partial data) of the stock data recorded in the hard disc array 30 in an overlapping manner on the stock data. Accordingly, the recording capacity of the hard disc array 30 does not become wasted and editing of audio and/or video data spanning a long period of time by the editing apparatus 50 becomes possible.

Note that, the hard disc array 30 can be replaced by another recording and reproducing apparatus realizing an equivalent recording capacity by using for example a large number of MO disc devices.

Further, it is also possible to have the data recording and reproducing apparatus 1 deal with just one of the video data or the audio data.

Further, so far as the same function and performance can be realized, it is not a problem whether the component parts of the data recording and reproducing apparatus 1 are constituted in terms of software or constituted in terms of hardware.

Further, the component parts of the data recording and reproducing apparatus 1 can be replaced by other means having an equivalent function and performance.

Second Embodiment

Below, a second embodiment of the present invention will be explained.

According to the method of management of the recording regions in the control system 10 of the data recording and reproducing apparatus 1 shown in the first embodiment, a predetermined effect, i.e., the effective utilization of the recording capacity of the hard disc array 30, can be achieved, but since the editing data is recorded in the RAM circuit 106 (FIG. 2) in a form not changed from the state received from the editing apparatus 50 and is converted to data showing the recording regions of the partial data at the time of reproduction, there is a problem of a long processing time. Further, it is cannot be determined which data among the stock data recorded in the hard disc array 30 will be used as the stock data until the content of the editing data is viewed, thus there is a problem in that the data may be deleted irrespective of the fact that it is to be used as the stock data.

In the second embodiment, in order to solve such a problem, the file management method in the control system 10 is improved. In the control system 10 of the second embodiment, a reproduction entry of a linked list format indicating the recording regions of the partial data contained in the same edited data is generated in advance based on the record entry and the editing data, the partial data is reproduced based on this reproduction entry, and further an identification flag (delete enable flag) is added to the record entry in the control system 10 and the reproduction entry. This delete enable flag is checked to prevent the stock data from being unintentionally deleted.

Note that, the operation of the recording system 20, hard disc array 30, and the reproducing system 40 of the data recording and reproducing apparatus 1 in the second embodiment and the operation of the recording system 20, the hard disc array 30, and the reproducing system 40 of the data recording and reproducing apparatus 1 in the first embodiment are the same. Only the processing regarding the management of the stock data and partial data of the control system 10 are different.

FIG. 9 is a view corresponding to FIG. 3 in the first embodiment and illustrates the recording region data (first recording region data) of the recording region occupied by the stock data A and B in the recording medium of the hard disc array 30 shown in FIG. 1 and the stock data in the second embodiment.

FIG. 10 is a view corresponding to FIG. 4 in the first embodiment and illustrates the content of the recording region data of the stock data stored in the RAM circuit 106 by the microprocessor circuit 102 shown in FIG. 2 in the second embodiment.

Note that, FIGS. 9A, 9D and FIGS. 10A, 10C are the same as FIGS. 3A, 3D and FIGS. 4A, 4C.

The processing for the management of the stock data and the partial data of the control system 10 will be concretely explained by referring to the same example as that for the first embodiment.

Figure 9A:
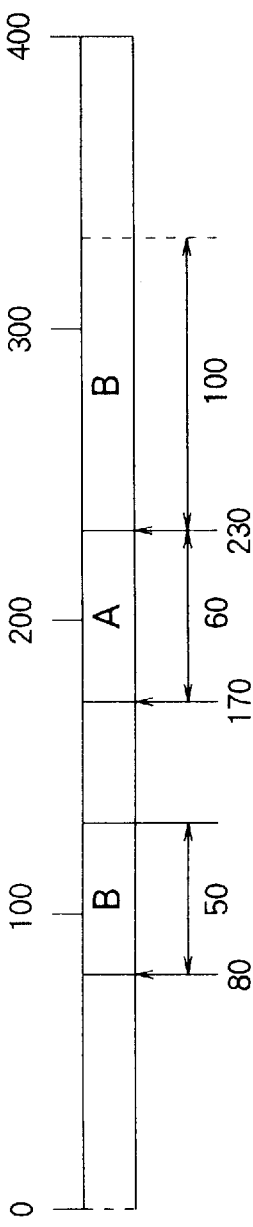
FIGS. 9A to 9D are views illustrating a recording region occupied by stock data A and B in the recording medium of the hard disc array shown in FIG. 1 and the recording region data (first recording region data) in the second embodiment.

As shown in FIG. 9A, the stock data A and B are recorded in the recording medium of the hard disc array 30, the stock data A is recorded in the 80th block to 129th block and the 230th block to 329th block from the head of the recording medium, the stock data B is recorded in the 170th block to 229th block from the head of the recording medium, and the other recording regions are empty recording regions.

Figure 9B:
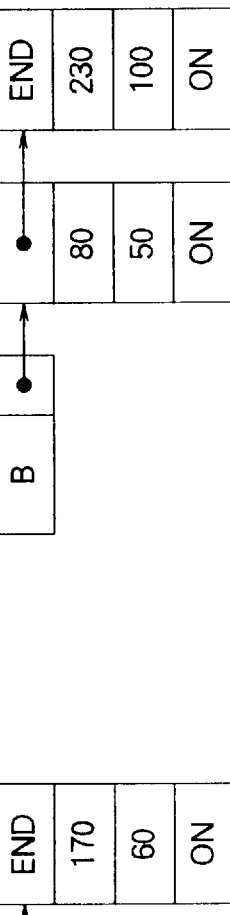
Figure 9C:
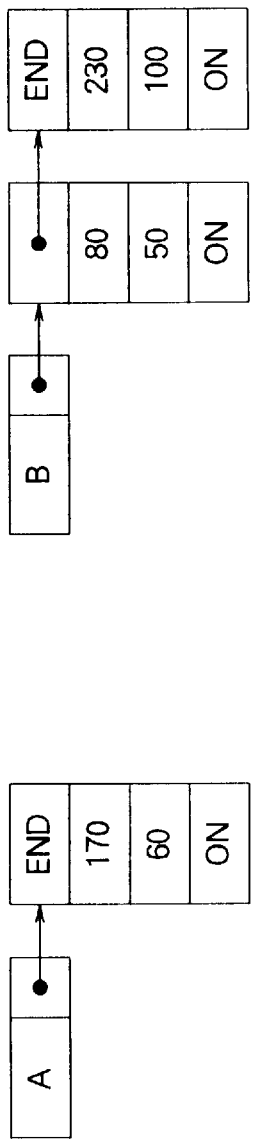

The microprocessor circuit 102 prepares the recording region data of each of the stock data A and B as the record entry shown in FIGS. 9B and 9C in the same way as the control system 10 in the first embodiment and stores link data (file entry) indicating the file name and the first record entry in the RAM circuit 106 as shown in FIG. 10A for each of the stock data A and B. In the second embodiment, unlike the first embodiment, as shown in FIG. 10B, an identification flag (delete enable flag; ON, OFF) indicating whether or not the corresponding stock data can be deleted is added to the record entry in addition to the data shown in FIG. 4B. The value OFF of this delete enable flag indicates that the corresponding audio and/or video data cannot be deleted, and the value ON of the delete enable flag indicates that the corresponding audio and/or video data can not be deleted.

Figure 9D:
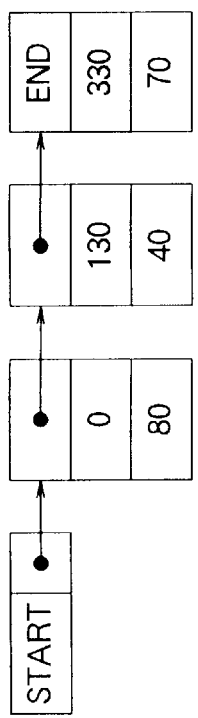

Further, the microprocessor circuit 102 generates the free space list shown in FIG. 9D and FIG. 10C in the same way as the control system 10 in the first embodiment. The free space list is clearly distinguished from the other list in the processing of the microprocessor circuit 102, the free space list is required even if no stock data is recorded in the hard disc array 30 and will not be deleted, therefore the delete enable flag is not added.

FIG. 11 is a view illustrating the reproduction entry generated based on the editing data output by the editing apparatus 50 shown in FIG. 1 to the control system 10 of the data recording and reproducing apparatus 1 and the record entry and the editing data shown in FIGS. 9B and 9C in the second embodiment.

Figures 11A, 11B:
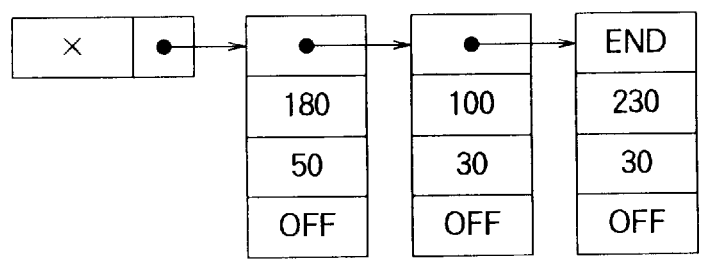
FIG. 11A and FIG. 11B are views illustrating the editing data output by the editing apparatus shown in FIG. 1 to the control system 10 of the data recording and reproducing apparatus and the reproduction entry generated based on the record entry and editing data shown in FIG. 9 in the second embodiment.

The editing apparatus 50 (FIG. 1) outputs for example the editing data shown in FIG. 11A to the external IF circuit 100 of the control system 10 in the second embodiment in the same way as the first embodiment. This editing data indicates that the part (partial data) contained in the range from the 10th block to 50th block of the stock data A and the partial data contained in the range from the 20th block to 50th block of the stock data B and the partial data contained in the range from the 0th block to the 30th block of the stock data B' are contained in the edited data X in this order.

The microprocessor circuit 102 of the control system 10 stores the link data (file entry) indicating the file name X shown in FIG. 11B and the first reproduction entry in the RAM circuit 106 based on the editing data (FIG. 11A received from the editing apparatus 50 and the record entry (FIGS. 9A, 9B). Further, the microprocessor circuit 102 generates the recording region data (reproduction entry) indicating that the partial data contained in the stock data A and B are recorded in the 40 blocks from the 180th block from the head of the recording region of the recording medium of the hard disc array 30, in the 30 blocks from the 100th block, and in the 30 blocks from the 230th block, adds this while making the value of the delete enable flag OFF, and stores this in the RAM circuit 106. The microprocessor circuit 102 generating the reproduction entry makes the value of the record entry of the audio and/or video data (stock data) referred to by the reproduction entry ON and records the recording region data in the predetermined recording region of the recording medium of the hard disc array 30.

As shown in the first embodiment, in comparison with a case where the editing data is stored in the RAM circuit 106 as it is and the recording regions of the partial data are calculated at the time of reproduction, as shown in the second embodiment, if the reproduction entry is generated in the form of a linked list shown in FIG. 11B in advance and stored in the RAM circuit 106, the calculation of the recording regions of the partial data at the time of reproduction becomes unnecessary and audio and/or video data having the same content as that of the edited data can be quickly reproduced.

As illustrated in FIGS. 11B. in a case where the partial data is divided into no more than three blocks, the time for processing for calculation of the recording regions of the partial data at the time of reproduction does not particularly become obstruct the reproduction, but the larger the number of the division of the partial data, the longer the calculation processing time and the larger the possibility of obstructing the reproduction. Accordingly, where the editing data of the edited data containing a lot of partial data is input to the control system 10 from the editing apparatus 50, the merit of generating the reproduction entry in advance becomes large.

Below, the operation of the data recording and reproducing apparatus 1 in the second embodiment will be explained focusing on the generation of the record entry and the reproduction entry. Note that, as mentioned above, the operations of the recording system 20, hard disc array 30, reproducing system 40, and editing apparatus 50 in the second embodiment are as explained referring to the first embodiment, and only the processing of the control system 10 in the second embodiment (concretely, the storage content of the ROM circuit 104) is different from that of the first embodiment.

First, the operation for recording the audio and/or video signal input from the outside in the hard disc array 30 by the data recording and reproducing apparatus 1 will be explained taking as an example a case where the audio and/or video data A shown in FIG. 9A is recorded.

Figure 12:
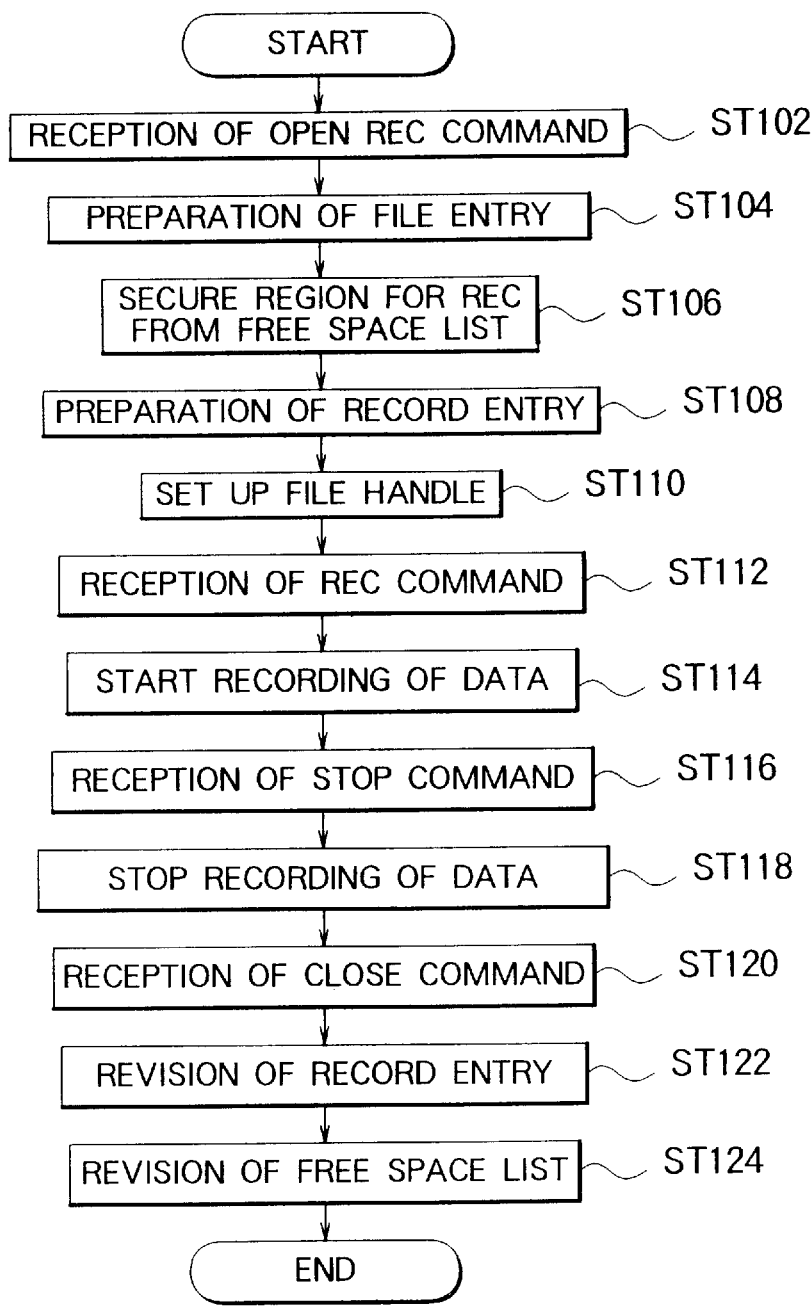
FIG. 12 is a flowchart showing the processing when the microprocessor circuit of the control system shown in FIG. 2 records the audio and/or video data input from the outside in the hard disc array in the second embodiment.

FIG. 12 is a flowchart showing the processing when the microprocessor circuit 102 of the control system 10 shown in FIG. 2 records the audio and/or video data input from the outside in the hard disc array 30 in the second embodiment.

Figure 13:
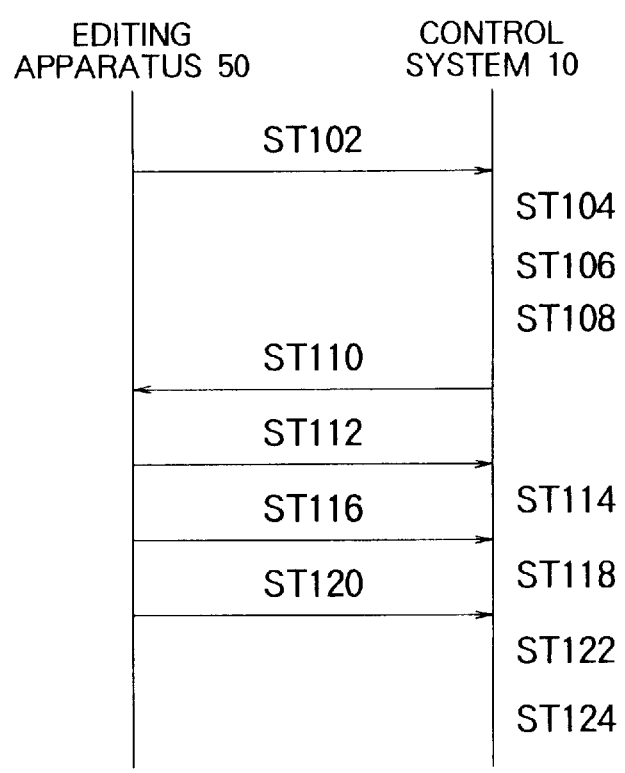
FIG. 13 is a signal sequence diagram between the editing apparatus and the control system when the microprocessor circuit of the control system shown in FIG. 2 records the audio and/or video data input from the outside in the hard disc array in the second embodiment.

FIG. 13 is a signal sequence diagram between the editing apparatus 50 and the control system 10 when the microprocessor circuit 102 of the control system 10 shown in FIG. 2 records the audio and/or video data input from the outside in the hard disc array 30 in the second embodiment.

As shown in FIG. 12 and FIG. 13, at step 102 (ST102), the editing apparatus 50 (FIG. 1) outputs a command (OPEN_REC command) containing predetermined data such as the file name A and data length (60 blocks) for making the control system 10 (FIG. 2) prepare the record entry of the audio and/or video data etc. to the control system 10. The control system 10 receives this OPEN_REC command.

At step 104 (ST104), the microprocessor circuit 102 of the control system 10 generates the file entry (FIGS. 9B, 9C and 10B) and the other data (FIG. 10A), stores them in the RAM circuit 106, and further records them in a predetermined recording region of the recording medium of the hard disc array 30.

At step 106 (ST106), the microprocessor circuit 102 of the control system 10 analyzes the free space list stored in the RAM circuit 106 and secures the regions for the recording.

At step 108 (ST108), the microprocessor circuit 102 of the control system 10 generates the record entry (FIG. 9B) based on the data such as the file name contained in the OPEN_REC command, records this in the RAM circuit 106, and records this in the hard disc array 30.

At step 110 (ST110), the microprocessor circuit 102 of the control system 10 generates the file handle (FIG. 19A), stores this in the RAM circuit 106, and records this in the hard disc array 30.

At step 112 (ST112), the editing apparatus 50 outputs the command (REC command) for starting the recording of the audio and/or video data A to the control system 10. The microprocessor circuit 102 of the control system 10 receives this REC command.

At step 114 (ST114), the microprocessor circuit 102 of the control system 10 receiving the REC command controls the recording system 20 to make it record the audio and/or video data input from the external apparatus in the hard disc array 30.

At step 116 (ST116), the editing apparatus 50 outputs the command for ending the recording of the audio and/or video data A (STOP command) to the control system 10. The control system 10 receives this STOP command.

At step 118 (ST118), the microprocessor circuit 102 of the control system 10 receiving the STOP command controls the recording system 20 to stop the recording of the audio and/or video data A.

At step 120 (ST120), the editing apparatus 50 outputs the command for revising (updating) the record entry and the free space list (CLOSE command) to the control system 10. The microprocessor circuit 102 of the control system 10 receives this CLOSE command.

At step 122 (ST122) and step 124 (ST124), the microprocessor circuit 102 of the control system 10 updates the record entry and the free space list.

Next, the operation where the data recording and reproducing apparatus 1 reproduces the audio and/or video signal recorded in the hard disc array 30 and outputs the same will be explained by taking as an example a case where the audio and/or video data A shown in FIG. 9A is recorded.

Figure 14:
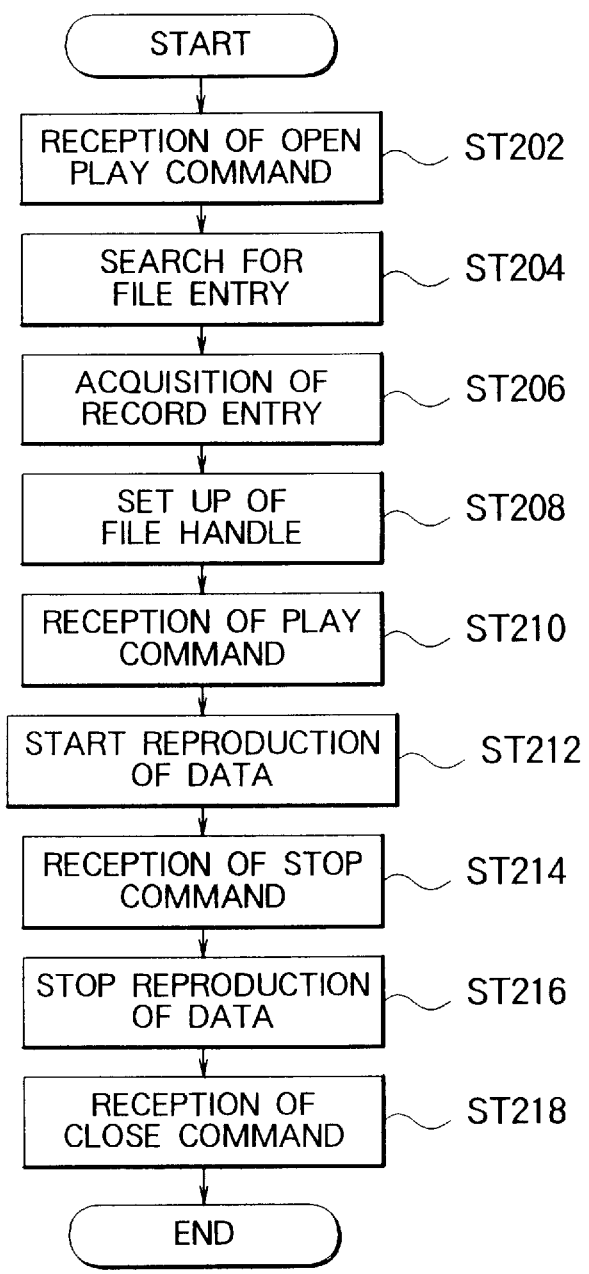
FIG. 14 is a flowchart showing the processing when the microprocessor circuit of the control system shown in FIG. 2 reproduces the audio and/or video data in the second embodiment.

FIG. 14 is a flowchart showing the processing when the microprocessor circuit 102 of the control system 10 shown in FIG. 2 reproduces the audio and/or video data in the second embodiment.

Figure 15:
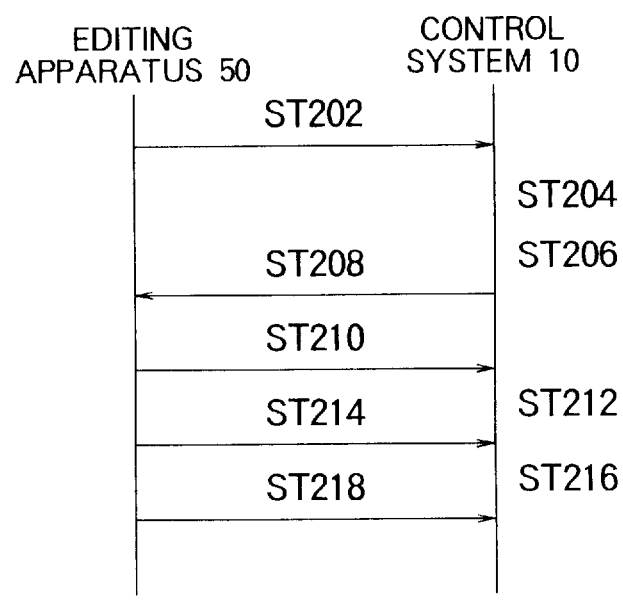
FIG. 15 is a signal sequence diagram of the processing when the microprocessor circuit of the control system shown in FIG. 2 reproduces the audio and/or video data in the second embodiment.

FIG. 15 is a signal sequence diagram of the processing when the microprocessor circuit 102 of the control system 10 shown in FIG. 2 reproduces the audio and/or video data.

At step 202 (ST202), the editing apparatus 50 outputs the command for preparing the reproduction of the audio and/or video data containing the data such as the file name A (OPEN_PLAY command) to the control system 10. The microprocessor circuit 102 of the control system 10 receives this OPEN_PLAY command.

At step 204 (ST204) and step 206 (ST206), the microprocessor circuit 102 of the control system 10 searches for the file entry recorded in the RAM circuit 106 (FIG. 2) and finds the record entry of the audio and/or video data A based on the result of the search.

At step 208 (ST208), the control system 10 generates the file handle and records this in the RAM circuit 106.

At step 210 (ST210), the editing apparatus 50 outputs the command for starting the reproduction of the audio and/or video data A (PLAY command) to the control system 10. The microprocessor circuit 102 of the control system 10 receives this PLAY command.

At step 212 (ST212), the microprocessor circuit 102 of the control system 10 controls the reproducing system 40 to reproduce the audio and/or video data A recorded in the hard disc array 30 and output the same to the editing apparatus 50 and further outputs the record entry of the audio and/or video data A to the editing apparatus 50.

At step 214 (ST214), the editing apparatus 50 outputs the command (STOP command) for stopping the reproduction of the audio and/or video data A to the control system 10. The control system 10 receives this STOP command.

At step 216 (ST216), the control system 10 controls the recording system 20 and makes it stop the reproduction of the audio and/or video data A.

At step 218 (ST218), the editing apparatus 50 outputs the command for revising (updating) the record entry and the free space list (CLOSE command) to the control system 10. The control system 10 receives this CLOSE command and closes the file of the audio and/or video data A which has been reproduced.

Below, an explanation will be made of the operation of the data recording and reproducing apparatus 1 when only the partial data from among the stock data are combined and reproduced based on the editing data (VFL; Virtual File List) and the reproduction entry used for reproducing the audio and/or video data having the same content as that of the edited data is generated by taking as an example a case of the edited data X (reproduction entry shown in FIG. 11B).

Figure 16:
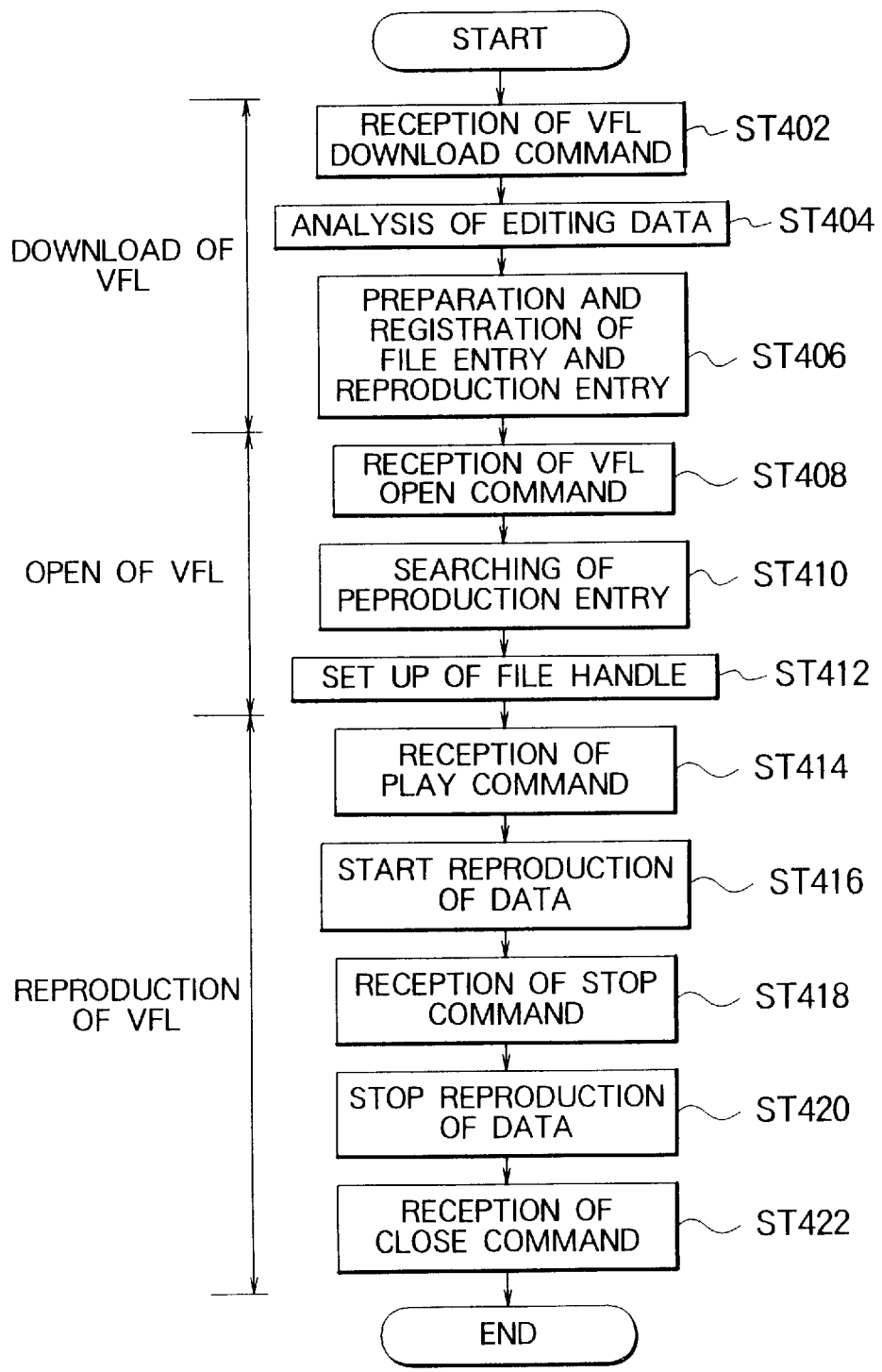
FIG. 16 is a flowchart showing the processing when the microprocessor circuit of the control system shown in FIG. 2 reproduces the audio and/or video data based on the reproduction entry (FIG. 11B) in the second embodiment.

FIG. 16 is a flowchart showing the processing when the microprocessor circuit 102 of the control system 10 shown in FIG. 2 reproduces the audio and/or video data based on the reproduction entry (FIG. 11B) in the second embodiment.

As shown in FIG. 16, at step 402 (ST402), the editing apparatus 50 outputs the command (VFL_DOWNLOAD command) containing the editing data for making the control system 10 receive the editing data to the control system 10. The control system 10 receives this VFL_DOWNLOAD command.

At step 404 (ST404) and step 406 (ST406), the control system 10 analyzes the received editing data and the record entry (FIGS. 9B and 9C) of the audio and/or video data A and B, generates the reproduction entry of the edited data X and the file entry (FIG. 11B) thereof, stores them in the RAM circuit 106, and further records them in a predetermined recording region of the hard disc array 30.

At step 408 (ST408), the editing apparatus 50 outputs to the control system 10 the command for combining the partial data based on the reproduction entry and making the control system 10 perform the preparations for reproducing the audio and/or video data having the same content as that of the edited data (VFL_OPEN command). The control system 10 receives this VFL_OPEN command.

At step 410 (ST410), the microprocessor circuit 102 of the control system 10 searches for the reproduction entry of the edited data X stored in the RAM circuit 106. Note that, at this time, the reproduction entry of the edited data X is treated exactly the same as the audio and/or video data A and B.

At step 412 (ST412), the microprocessor circuit 102 of the control system 10 generates the file handle.

At step 414 (ST414), the editing apparatus 50 outputs the PLAY command to the control system 10. The control system 10 receives this PLAY command.

At step 416 (ST416), the microprocessor circuit 102 of the control system 10 controls the reproducing system 40 to make it reproduce the partial data from the hard disc array 30 based on the reproduction entry.

At step 418 (ST418), the editing apparatus 50 outputs the STOP command to the control system 10. The control system 10 receives this STOP command.

At step 420 (ST420), the microprocessor circuit 102 of the control system 10 controls the reproducing system 40 and makes it stop the reproduction of the partial data.

At step 424 (ST424), the editing apparatus 50 outputs the CLOSE command to the control system 10. The control system 10 receives this CLOSE command.

Next, the processing for generating the reproduction entry from the editing data by the microprocessor circuit 102 (FIG. 2) of the control system 10 (ST404 in FIG. 16) will be explained in further detail.

Figure 17B:
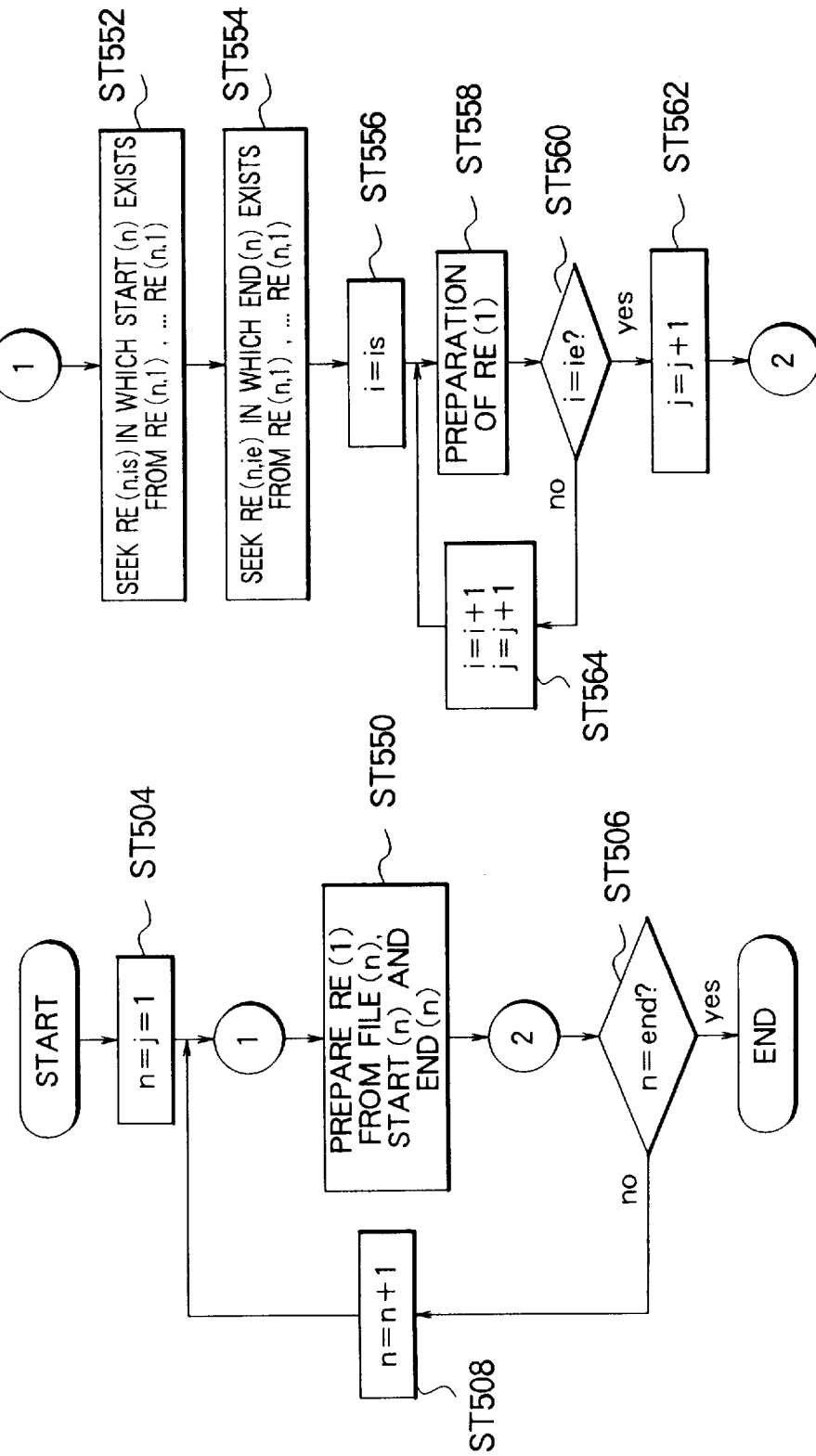
FIG. 17A and FIG. 17B are flowcharts showing the processing for generating the reproduction entry from the editing data by the microprocessor circuit of the control system shown in FIG. 2 in the second embodiment.
Figure 17A:
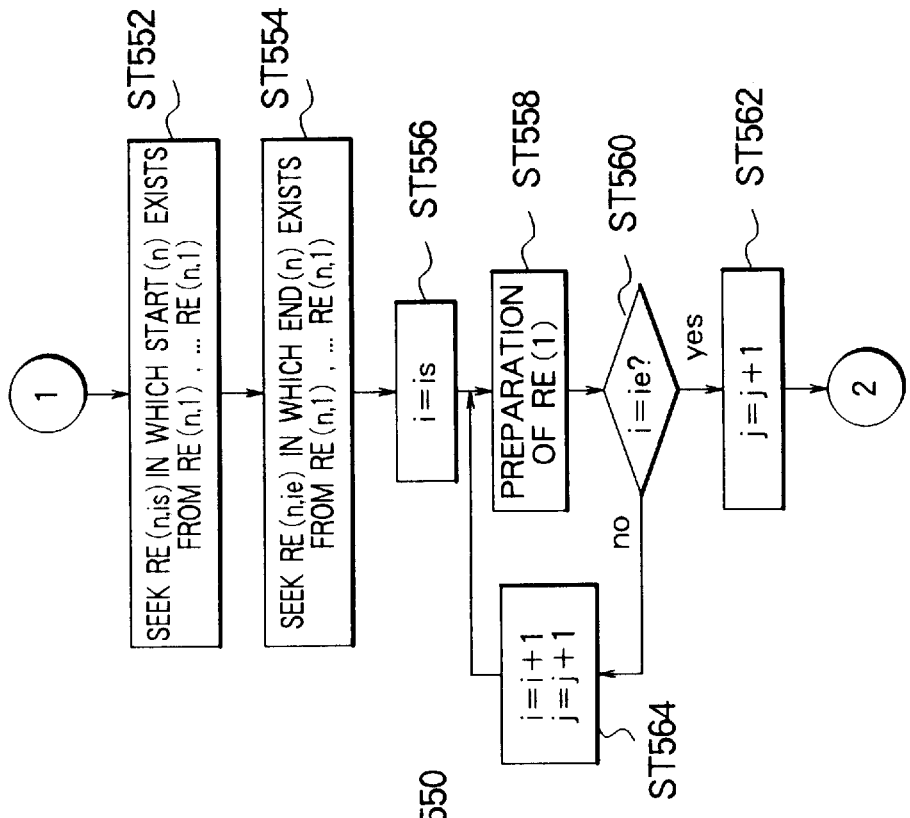

FIG. 17 is a flowchart showing the processing for generating the reproduction entry from the editing data by the microprocessor circuit 102 of the control system 10 (FIG. 2) in the second embodiment.

FIG. 18 is a view illustrating the editing data, the record entry, and the reproduction entry.

As shown in FIG. 17, at step 504 (ST504), the microprocessor circuit 102 brings the values of the variables n and j to 1. Note that, the variable n is used for the search of the file name data (FIG. 18B) of the record entry of the stock data, and the variable j is used for the search of the partial data contained in the reproduction entry (FIG. 18C).

At step 550 (ST550), the reproduction entry is generated from the file name data (FILE(n)) of the editing data (FIG. 18A), the reproduction start position data (START(n)), and the reproduction ending position data (END(n)). A detailed description is given in step 552 (ST562).

At step 552 (ST552), the microprocessor circuit 102 of the control system 10 searches for the record entry (RE(n)) of the stock data containing the reproduction start position data (START(n)).

At step 554 (ST554), the microprocessor circuit 102 of the control system 10 searches for the record entry (RE(n)) of the stock data containing the reproduction ending position data (END(n)).

At step 556 (ST556), the microprocessor circuit 102 of the control system 10 brings the variable i to the numerical value "is". Note that, the variable i is used for the search of the data contained in the record entry.

At step 558 (ST558), the microprocessor circuit 102 of the control system 10 generates the reproduction entry (RE(J)) of the edited data X.

At step 560 (ST560), the microprocessor circuit 102 of the control system 10 decides whether or not the value of the variable i is "ie". Note that, the numerical value "ie" indicates the number of the reproduction entries (RE(j)). Where the value of the variable i is the numerical value "ie", the operational routine proceeds to the processing of ST562, while where it is not the numerical value "ie", the operational routine proceeds to the processing of ST564.

At step 562 (ST562), the microprocessor circuit 102 of the control system 10 adds the numerical value 1 to the variable j (increments) and proceeds to the processing of ST506.

At step 564 (ST564), the microprocessor circuit 102 of the control system 10 increments the variables i and j and proceeds to the processing of ST558.

At step 506 (ST506), the microprocessor circuit 102 of the control system 10 decides whether or not the value of the variable n is the numerical value "end". Note that, the numerical value "end" indicates the number of the stock data. Where the variable n is the numerical value "end", the processing is ended, while where it is not the numerical value "end", the operational routine proceeds to the processing of ST508.

At step 508 (ST508), the microprocessor circuit 102 of the control system 10 increments the variable n and proceeds to the processing of ST550 (ST552).

Below, an explanation will be made of the processing of the control system 10 at the time of deletion of the record entry of the audio and/or video data (stock data) and the reproduction entry of the edited data and the updating of the free space list.

The microprocessor circuit 102 of the control system 10 receiving the command for deleting the audio and/or video data from the editing apparatus 50 searches for the record entry, deletes only the data in which the value of the delete enable flag is ON, and adds the recording region of the hard disc array 30 indicated by the deleted record entry to the free space list.

The microprocessor circuit 102 does not delete a record entry in which the value of the delete enable flag is OFF.

Note that, the microprocessor circuit 102 of the control system 10 receiving the command for deleting the reproduction entry from the editing apparatus 50 searches for the reproduction entry, confirms that the value of the delete enable flag is ON, and deletes this.

The value of the delete enable flag of the reproduction entry is ON as mentioned above, therefore the stock data (partial data) referred to by the reproduction entry is not usually deleted by the delete command from the editing apparatus 50.

By changing the processing of the control system 10 as mentioned in the second embodiment, the audio and/or video data having the same content as that of the edited data can be reproduced without a necessity of recording the edited data in the hard disc array 30. In addition, the reproduction entry is generated in advance and the reproduction is performed based on this reproduction entry, therefore the processing time for calculation of the recording regions of the partial data shown in the first embodiment becomes unnecessary. Accordingly, the processing time for calculation of the recording regions will not obstruct the reproduction.

In addition, the generation of the reproduction entry shown in the second embodiment is performed just by rewriting the storage content of the RAM circuit 106, thus it is not necessary to make any change to the hardware of the data recording and reproducing apparatus 1 shown in the first embodiment.

Further, the limitation by the delete enable flag is added to the processing for deletion of the recording region data, therefore the problem of unintentional deletion of the stock data being referred to by the reproduction entry does not occur.

Figures 19A, 19B:
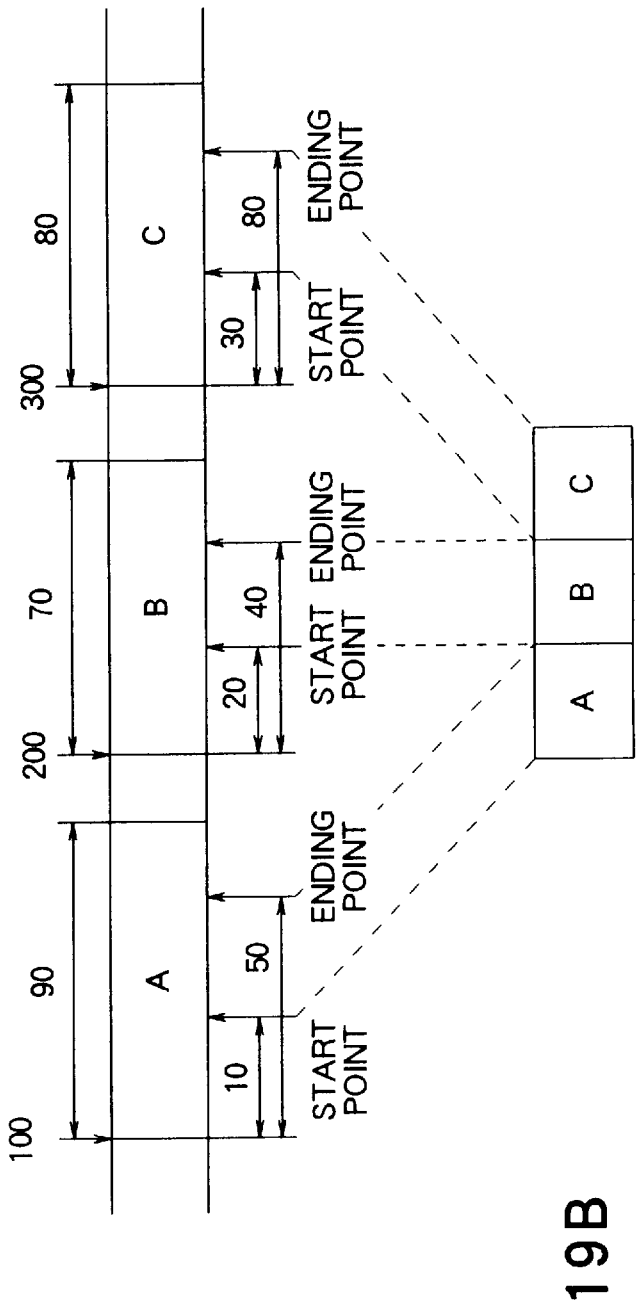
FIG. 19A and FIG. 19B are views showing the processing for reproducing the audio and/or video data having the same content as that of the edited data by combining the partial data of three or more series of stock data by the data recording and reproducing apparatus shown n FIG. 1.

Note that, needless to say the data recording and reproducing apparatus 1 according to the present invention not only can generate a reproduction entry from two series of stock data, but also can generate a reproduction entry for reproducing the audio and/or video data having the same content as that of the edited data by combining partial data (FIG. 19B) of three or more stock data (FIG. 19A).

Further, the algorithm of the control system 10 shown in the second embodiment and the signal sequence between the editing apparatus 50 and the control system are examples. So far as the same function and performance can be realized, other algorithms and signal sequences can be adopted.

Further, it is possible to make a modification similar to that for the first embodiment to the data recording and reproducing apparatus 1 shown in the second embodiment as well.

Third Embodiment

Below, a third embodiment of the present invention will be explained.

FIG. 20 is a view illustrating the audio and/or video data (edited data) generated as a result of the editing of the stock data A to D. Note, in the third embodiment, the recording capacity of one block of the recording medium of the hard disc array 30 is for example one megabyte (MB).

FIG. 21 is a view of the record entry of the stock data A to D (FIG. 20) and the reproduction entry of the edited data generated based on the editing data which the control system 10 (FIG. 1) shown in the second embodiment received from the editing apparatus 50.

Figures 20A, 20B:
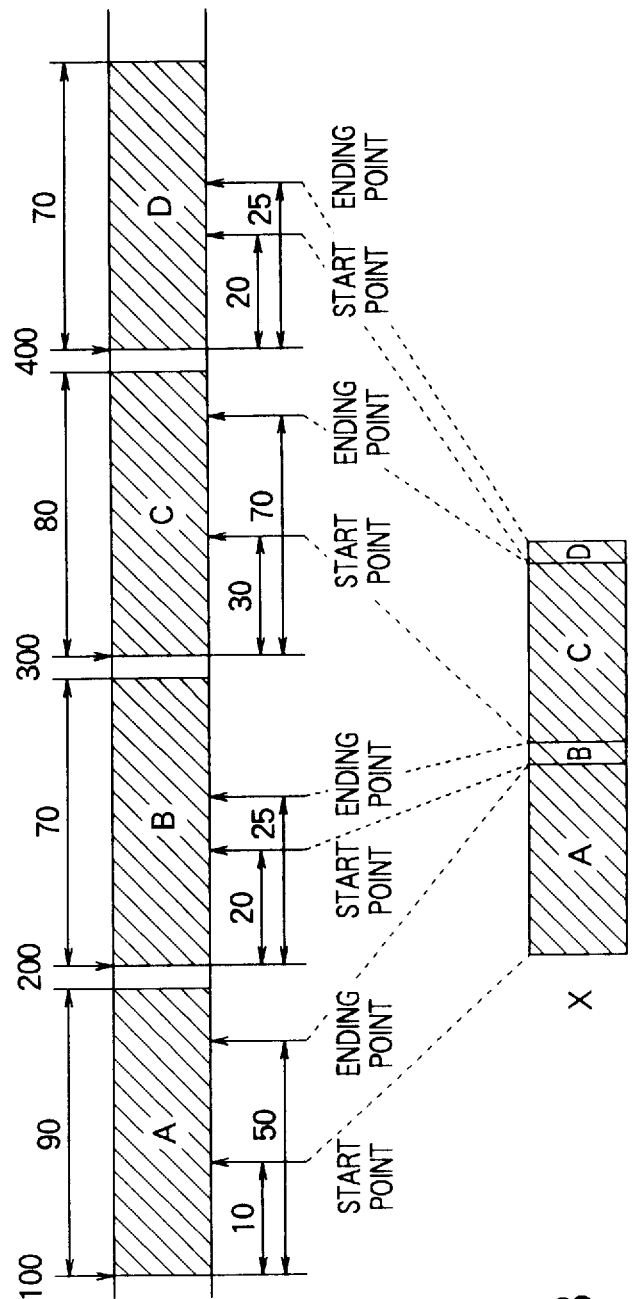
FIG. 20A and FIG. 20B are views illustrating the audio and/or video data generated as the result of the editing with respect to the stock data A to D.

For example, where the editing apparatus 50 respectively edits the partial data having the data lengths of 40 blocks, 5 blocks, 40 blocks, and 5 blocks contained in the stock data A to D shown in FIG. 20A to obtain the edited data shown in FIG. 20B, the editing data shown in FIG. 21B is input to the control system 10 of the data recording and reproducing apparatus 1 from the editing apparatus 50.

When the control system 10 of the data recording and reproducing apparatus 1 shown in the second embodiment performs the processing based on this editing data (FIG. 21B) and the record entry of the stock data A to D shown in FIG. 21A, the reproduction entry of the edited data X shown in FIG. 21C is obtained.

However, the data length of the partial data (partial data B and D) of the stock data B and D has become as short as 5 blocks. When reproducing the audio and/or video data having the same content as that of such edited data is reproduced, the last part of each of the partial data A and C and the starting part of each of the partial data B and D are recorded in separate recording regions on the recording medium of the hard disc array 30, therefore access to distant recording regions of the recording medium of the hard disc array 30 and a wait for rotation become necessary at the end of reproduction of the partial data B and D. On the other hand, each of the partial data B and D has a small data length such as 5 MB, so there is a possibility that the buffer circuit 402 (FIG. 2) of the reproducing system 40 will suffer from an underflow within the time required for the access and wait for rotation. When underflow occurs in the buffer circuit 402, continuous reproduction becomes impossible.

The data recording and reproducing apparatus 1 in the third embodiment is aimed at the solution of such a problem.

FIG. 22 is a view of the processing of the control system 10 (FIG. 2) of the data recording and reproducing apparatus 1 in the third embodiment. Note that, FIG. 22A is the same as FIG. 20A.

In order to continuously reproduce the partial data having a short data length liable to cause an underflow of the buffer circuit 402, the control system 10 in the third embodiment analyzes the editing data (FIG. 21B) received from the editing apparatus 50, records short partial data and this short partial data in the predetermined recording region of the recording medium of the hard disc array 30 in advance, obtains a data length not causing the underflow in the buffer circuit 402, and avoids the above inconvenience.

Note that, the operation of the control system 10, recording system 20, hard disc array 30, and the reproducing system 40 of the data recording and reproducing apparatus 1 in the third embodiment, the operation of the recording system 20, hard disc array 30, and the reproducing system 40 of the data recording and reproducing apparatus 1 in the second embodiment, and the processing other than the management of the stock data and the partial data of the control system 10 are the same.

Below, the processing of the control system 10 in the third embodiment will be explained in brief by a concrete example.

Figure 22A:
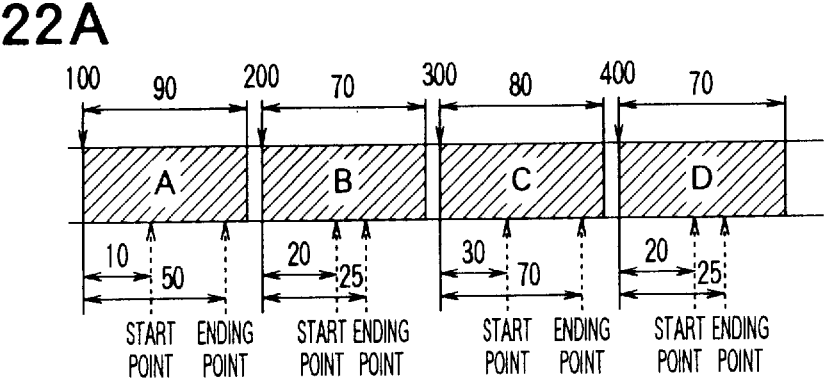
FIGS. 22A to 22D are views showing the processing content of the control system (FIG. 2) of the data recording and reproducing apparatus in the third embodiment.

Among the stock data A to D recorded in the 100th block to 189th block, the 200th block to 269th block, the 300th block to 379th block, and the 400th block to 469th block of the recording medium of the hard disc array 30 shown in FIG. 20A and FIG. 22A, the 110th block to 149th block (data length: 40 blocks), the 220th block to 224th block (data length: 5 blocks), the 330th block to 369th block (data length: 40 blocks), and the 420th block to 424th block (data length: 5 blocks) are contained in the edited data as the partial data A to D as shown in FIG. 20B.

Figure 22B:

For example, where there is a possibility of occurrence of underflow in the buffer circuit 402 (FIG. 2) where the data length is 10 blocks or less, there arises a possibility that continuous reproduction can no longer be carried out when reproducing the partial data B and D. On the other hand, as shown in FIG. 22B, even if the partial data A and C are divided into partial data A' and C' having a data length of 35 blocks and the partial data a and a having a data length of 5 blocks, when reproducing the partial data A', continuous reproduction is possible without obstacle.

Figure 22C:
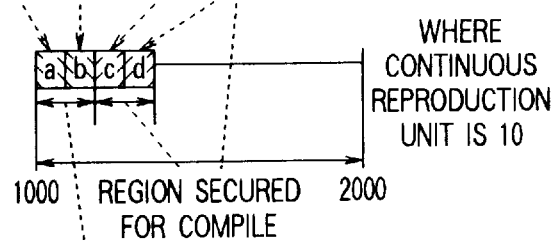

By utilizing this point, the control system 10 in the third embodiment controls the control system 20, places the partial data a and c in front of the short partial data B and D as shown in FIG. 22C to obtain the partial data ab and ad having the data length of 10 blocks, and records them in advance in a predetermined recording region (for example the 1000th block to 2000th block; compile recording region) of the recording medium of the hard disc array 30.

Figure 22D:
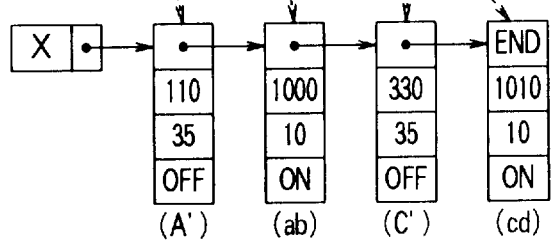

Further, as shown in FIG. 22D, for the partial data A', ab, C', and cd, it generates the same reproduction entry as that of the second embodiment and stores this in the RAM circuit 106. Where the audio and/or video data having the same content as that of the edited data (FIG. 20B) is reproduced, based on the reproduction entry shown in FIG. 22D, the partial data A', ab, C', and cd are reproduced from the hard disc array 30, whereby, other than the effect such as quick reproduction of the data recording and reproducing apparatus 1 shown in the second embodiment, the effect of guaranteeing the continuous reproduction can be obtained.

Note, as shown in FIG. 22D, the value of the delete enable flag of the partial data recorded in the compile recording region is made ON and the value of the delete enable flag of the other partial data is made OFF. The reason why the value of the delete enable flag is determined in this way is that, even if the data recorded in the compile recording region is deleted, the original stock data will be recorded in the hard disc array 30, so will not be lost.

Note that, where the data length of the partial data A and C is less than 15 blocks, continuous reproduction can be guaranteed by adding the partial data B and D to the partial data A and C and recording the same in the compile recording region and generating the reproduction entry.

Further, even if the partial data A and C and the partial data B and D are added, where the data length of each is less than 10 blocks, by further adding the partial data (not illustrated) before the partial data A to the partial data A and B, adding the partial data (not illustrated) after the partial data D to the partial data C and D, or continuously recording all of the partial data A to D in the compile recording region, continuous reproduction can be guaranteed.

Further, even if not the partial data immediately before the current data, but part of the partial data immediately after the current data is added to the short partial data, the same effect can be obtained.

The processing for recording the above explained short partial data in the compile recording region in advance together with part or all of the partial data immediately before the current data will be referred to as compile processing in the third embodiment.

Below, the content of the compile processing by the control system 10 in the third embodiment will be explained in detail.

Figure 23B:
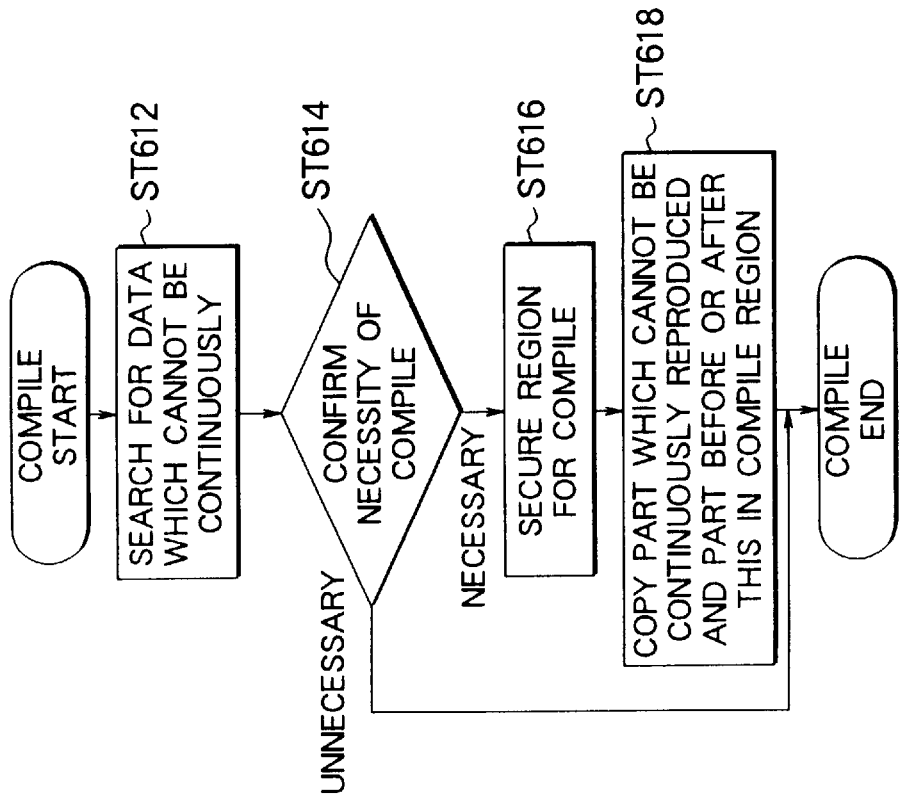

FIG. 23 is a flowchart showing the content of the compile processing performed by the control system 10 of the data recording and reproducing apparatus 1 in the third embodiment.

Figure 24:
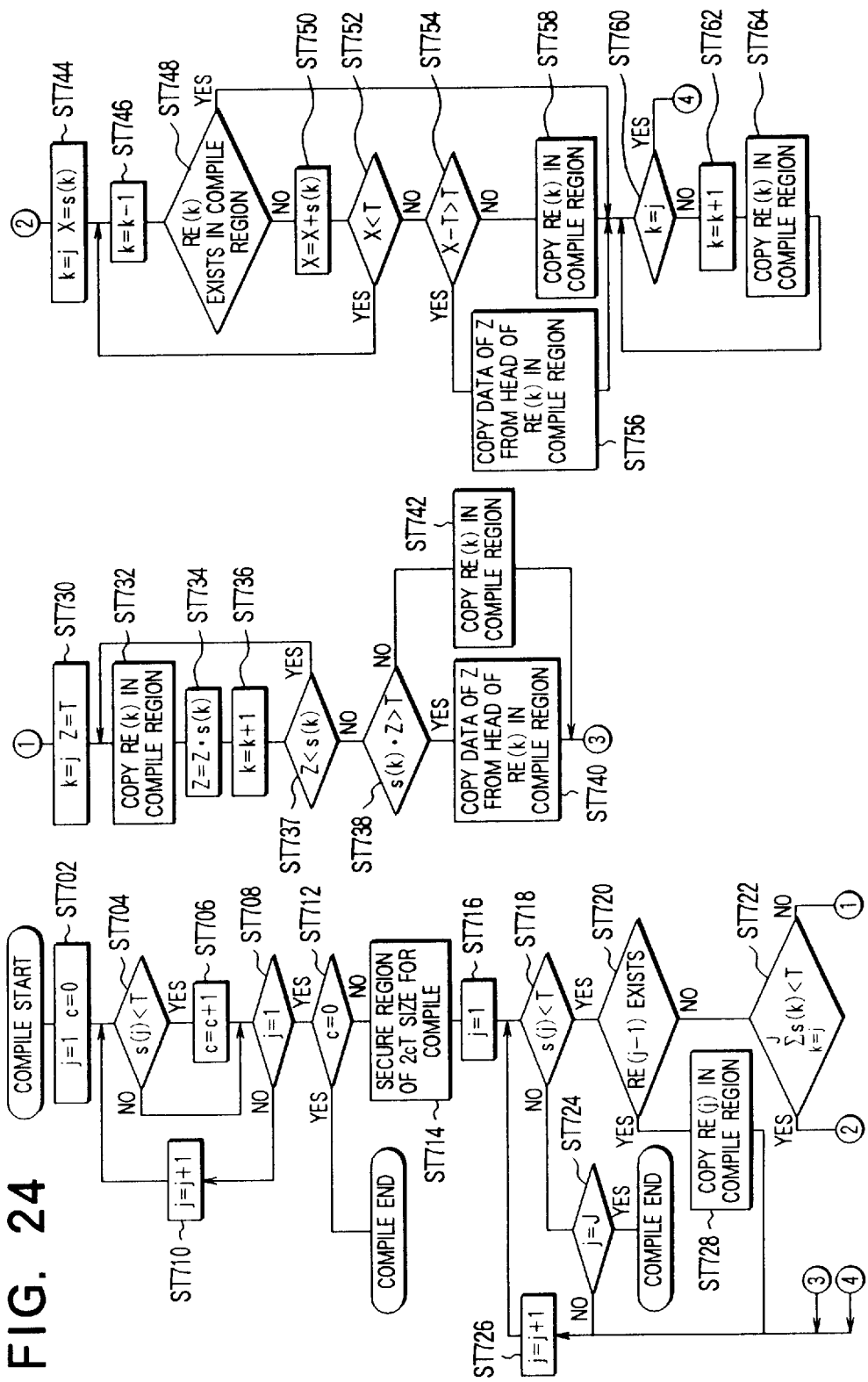
FIG. 24 is a flowchart showing the content of the compile processing performed by the control system of the data recording and reproducing apparatus in the third embodiment in further detail.

FIG. 24 is a flowchart showing the content of the compile processing performed by the control system 10 of the data recording and reproducing apparatus 1 in the third embodiment in further detail.

Figure 23A:
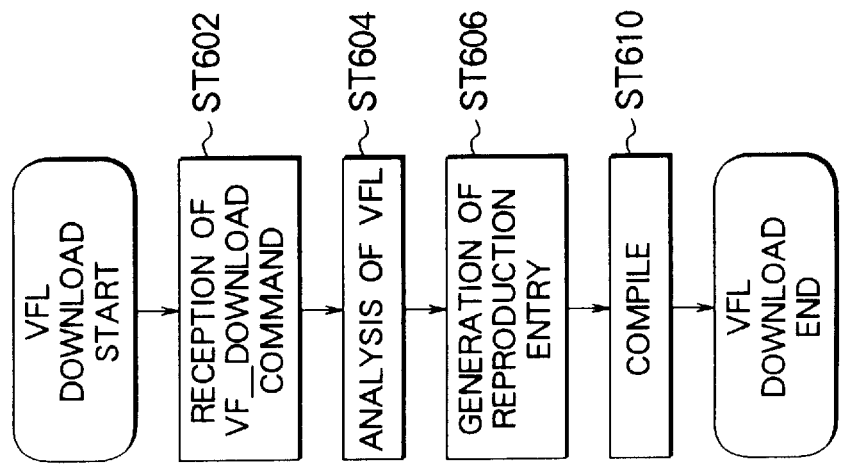

As shown in FIG. 23A, at step 602 (ST602), the editing apparatus 50 outputs to the control system 10 the command containing the editing data for making the control system 10 receive the editing data (VFL_DOWNLOAD command). The control system 10 receives this VFL_DOWNLOAD command.

At step 604 (ST604) and step 606 (ST606), the microprocessor circuit 102 of the control system 10 (FIG. 2) analyzes the received editing data and record entry of the audio and/or video data A and B (FIGS. 9B and 9C), generates the reproduction entry (FIG. 21C) of the edited data X and the file entry (FIG. 11B) thereof, stores them in the RAM circuit 106, and further records them in the predetermined recording region of the hard disc array 30.

At step 610 (ST610), the microprocessor circuit 102 of the control system 10 performs the compile processing shown in FIGS. 22B and 22C. The content of the compile processing is as shown in ST612 to ST618 shown in FIG. 23B.

At step 612 (ST612) and step 614 (ST614) (ST702 to ST708 in FIG. 24), the microprocessor circuit 102 of the control system 10 searches for the reproduction entry and detects the partial data with a data length not more than the predetermined value T (10 blocks in the example shown in FIG. 22), that is, the partial data which cannot be continuously reproduced. Where there is only one series of partial data having a data length not more than the predetermined value T and the compile processing is necessary, the operational routine proceeds to the processing of ST616, while where it is not necessary, the processing is ended.

At step 616 (ST616) (ST714 in FIG. 24), the microprocessor circuit 102 of the control system 10 secures the recording region of the recording medium of the hard disc array 30 necessary for the compile processing (for the compile recording region (FIG. 22C)). Note that, where the compile recording region is provided in the recording medium of the hard disc array 30 in a fixed manner, the processing of ST616 is unnecessary. Further, where the compile recording region is insufficient, it is necessary to further enlarge the compile recording region.

At step 618 (ST618) (ST716 to ST714 in FIG. 24), the microprocessor circuit 102 of the control system 10 continuously records part of the partial data before and after the partial data for which the continuous reproduction is impossible in the compile recording region as shown in FIG. 22C and changes the data length to above T. Further, the microprocessor circuit 102 of the control system 10 prepares the reproduction entry (FIG. 22D anew based on the partial data after the compilation, stores this in the RAM circuit 106, and records this in the predetermined recording region of the recording medium of the hard disc array 30.

Note that, the microprocessor circuit 102 of the control system 10 manages the empty recording regions using the free space list (FIG. 9D) and the processing for securing the recording region also for the compile recording region.

Figure 25:
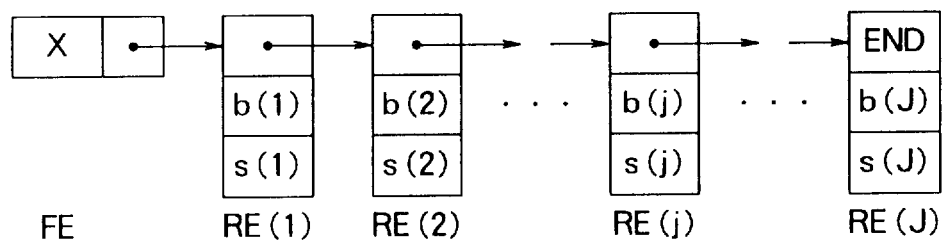
FIG. 25 is a view for defining the data b(k) and s(j) in the reproduction entry R(k) in the flowchart shown in FIG. 24.

Note that, in the flowchart shown in FIG. 24, the data b(k) and s(j) in the reproduction entry R(k) are defined as shown in FIG. 25, and the variables Z and s(k) are defined as shown in FIG. 26.

Figure 26A:
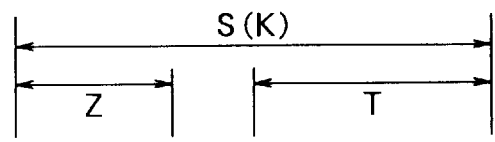
FIG. 26A and FIG. 26B are views for defining the variable Z in the processing at ST740 shown in FIG. 24 and the numerical value s(k)-T-X in the processing of ST756 shown in FIG. 24.

That is, the variable Z in ST740 in FIG. 24 indicates the data length of the data removed from the partial data immediately before the short partial data for obtaining the data having the data length T or more in addition to the short partial data (FIG. 20B) as shown in FIG. 26A.

Figure 26B:
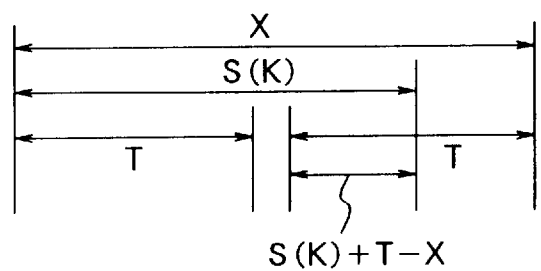

Further, the numerical value s(k)-T-X at ST756 in FIG. 24 indicates the data length of the data removed from the partial data immediately after the short partial data so as to obtain the data having the data length T or more in addition to the short partial data (FIG. 20B) as shown in FIG. 26B.

Based on the reproduction entry prepared as described above, by performing the processing shown in FIG. 16 in the second embodiment, the data recording and reproducing apparatus 1 shown in the third embodiment can continuously reproduce the audio and/or video data the same as the edited data quickly and in addition reliably similar to the data recording and reproducing apparatus 1 shown in the second embodiment.

As explained above, according to the data recording and reproducing apparatus 1 shown in the third embodiment, even in a case where the audio and/or video data having the same content as that of the edited data is reproduced by combining partial data having a variety of lengths, the continuity of the reproduced audio and/or video data is not degraded.

In addition, so as to realize the data recording and reproducing apparatus 1 shown in the third embodiment, it is sufficient so far as the storage contents of the ROM circuit 104 of the control system 10 of the data recording and reproducing apparatus 1 shown in the first embodiment and the second embodiment are changed. No change in terms of hardware is necessary.

Note that the data recording and reproducing apparatus 1 shown in the third embodiment may be similarly modified as with the data recording and reproducing apparatuses 1 shown in the first embodiment and the second embodiment.

According to the above audio and/or video data recording and reproducing apparatus and audio and/or video data recording and reproducing method of the present invention, it is possible to record a plurality of series of audio and/or video data to be edited in a randomly accessible recording medium such as a hard disc and MO disc, reproduce any audio and/or video data in accordance with the request of an outside apparatus such as an editing apparatus and provide the same.

Further, the above audio and/or video data recording and reproducing apparatus and audio and/or video data recording and reproducing method are suitable for editing of audio and/or video data over a long period.

Further, according to the above audio and/or video data recording and reproducing apparatus and audio and/or video data recording and reproducing method, audio and/or video data having exactly the same content as that of the audio and/or video data of the result of editing (edited data) can be reproduced without recording audio and/or video data having the same content in the recording medium in an overlapping manner.

What is claimed is:

1. An information data recording and reproducing apparatus comprising:

an information data recording means for recording a plurality of series of information data in a randomly accessible recording medium;

a first recording region generating means for generating first recording region data showing the recording regions occupied by the plurality of series of information data in the recording medium; and a combination reproducing means for reproducing by combination partial data which is part or all of the information data of stock data recorded in the recording medium, the combination reproducing means having a second recording region data generating means for generating second recording region data showing the recording regions occupied by the partial data to be reproduced by being combined in the recording medium based on the first recording region data of the stock data, and a partial data reproducing means for reproducing the partial data from the recording medium based on the generated second recording region data.

2. An information data recording and reproducing apparatus as set forth in claim 1, wherein the first recording region data generating means generates a first recording region list showing at least the recording regions occupied by the plurality of series of information data in the recording medium in the form of a linked list showing mutual linkage and includes this in the first recording region data;

the second recording region data generating means of the combination reproducing means generates a second recording region list showing at least the recording regions occupied by the partial data to be reproduced by combination in the recording medium in the form of the linked list based on order data showing the order for reproducing the partial data, reproduction range data showing the range occupied by the partial data in the stock data, and the first recording region data of the stock data and includes this in the second recording region data; and the partial data reproducing means reproduces the partial data from the recording regions of the recording medium shown by the second recording region list.

3. An information data recording and reproducing apparatus as set forth in claim 2, wherein the reproduction range data showing the range occupied by the partial data in the stock data contains a reproduction start position and a reproduction ending position of the partial data in the stock data.

4. An information data recording and reproducing apparatus as set forth in claim 3, wherein the first recording region list generated by the first recording region data generating means and the second recording region list generated by the second recording region data generating means further contain identification flags and adopt mutually the same structure of data;

the first recording region data generating means sets the identification flag of the first recording region list to a first value;

the second recording region data generating means of the combination reproducing means sets the identification flag of the second recording region list to a second value; and said apparatus further comprises a recording region releasing means for releasing the recording regions of the recording medium shown by the first recording region list and deleting the first recording region list only in a case where the value of the identification data is the first value when receiving a request for releasing the recording regions of the recording medium shown by the first recording region list and the second recording region list.

5. An information recording and reproducing apparatus as set forth in claim 1, wherein the plurality of series of information data comprises a plurality of at least audio or video data.

6. A method of recording and reproducing information data comprising steps of recording a plurality of series of information data in a randomly accessible recording medium;

generating a recording region list showing the recording regions occupied by partial data to be reproduced by being combined in the recording medium in the form of a linked list when reproducing by combination as partial data which is part or all of the information data of stock data recorded in the recording medium; and reproducing the partial data from the recording regions of the recording medium shown by the generated recording region list.

7. An information data recording and reproducing apparatus, comprising:

a first information data recording means for recording a plurality of series of information data in a randomly accessible recording medium;

a first recording region generating means for generating a first recording region data indicating the recording regions occupied by the plurality of series of information data in the recording medium a combination reproducing means for reproducing data by combining as partial data which is part or all of the information data serving as the stock data recorded in the recording medium; and a second information data recording means for continuously recording short partial data having a data length not more than a predetermined data length and a predetermined part of the partial data reproduced before and after the short partial data in a predetermined recording region of the recording medium where the data length of the partial data is not more than the predetermined data length, the being combined reproducing means having a second recording region data generating means for generating second recording region data indicating the recording regions occupied in the recording medium by the partial data reproduced by combination and the predetermined part of unit data and the short partial data recorded in the predetermined recording region of the recording medium based on the first recording region data of the stock data and a partial data reproducing means for reproducing the partial data from the recording medium based on the generated second recording region data.

8. An information data recording and reproducing apparatus as set forth in claim 2, wherein the plurality of series of information data comprises a plurality of series of at least audio or video data.

9. An information data recording and reproducing method comprising the steps of:

recording a plurality of series of information data in a randomly accessible recording medium;

continuously recording short partial data having a data length not more than a predetermined data length and a predetermined part of partial data reproduced before and after the short partial data in a predetermined recording region of the recording medium where the data length of the partial data is not more than the predetermined data length when reproducing data by combining partial data which is part or all of the information data serving as stock data recorded in the recording medium;

generating a recording region list by a link list format for indicating the recording regions occupied by the partial data reproduced in combination with the predetermined part of the partial data recorded in the predetermined recording region of the recording medium with the short partial data in the recording medium; and reproducing the partial data from the recording regions of the recording medium indicated by the generated recording region list.

* * * * *